(12) United States Patent
Nakamura

(10) Patent No.: US 9,560,341 B2
(45) Date of Patent: Jan. 31, 2017

(54) STEREOSCOPIC IMAGE REPRODUCTION DEVICE AND METHOD, STEREOSCOPIC IMAGE CAPTURING DEVICE, AND STEREOSCOPIC DISPLAY DEVICE

(71) Applicant: FUJIFILM Corporation, Tokyo (JP)

(72) Inventor: Satoshi Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1135 days.

(21) Appl. No.: 13/659,638

(22) Filed: Oct. 24, 2012

(65) Prior Publication Data

US 2013/0093859 A1    Apr. 18, 2013

Related U.S. Application Data

(63) Continuation of application No. PCT/JP2011/060095, filed on Apr. 25, 2011.

(30) Foreign Application Priority Data

Apr. 28, 2010    (JP) ................................ 2010-103905

(51) Int. Cl.
*H04N 13/04* (2006.01)
*H04N 21/4402* (2011.01)
(Continued)

(52) U.S. Cl.
CPC ............... *H04N 13/04* (2013.01); *G06F 3/14* (2013.01); *H04N 5/77* (2013.01); *H04N 5/907* (2013.01);
(Continued)

(58) Field of Classification Search
CPC ................... H04N 21/4402; H04N 21/440218; H04N 13/04
See application file for complete search history.

(56) References Cited

U.S. PATENT DOCUMENTS 6,163,337 A * 12/2000 Azuma ................. G06T 7/0022
                                                              348/43
6,798,406 B1 * 9/2004 Jones ................. H04N 13/0011
                                                              345/419
(Continued)

FOREIGN PATENT DOCUMENTS

JP    2003-333621 A    11/2003
JP    2004-334833 A    11/2004
(Continued)

*Primary Examiner* — David N Werner
(74) *Attorney, Agent, or Firm* — Birch, Stewart, Kolasch & Birch, LLP

(57) ABSTRACT

A stereoscopic image is displayed with an appropriate amount of parallax on the basis of auxiliary information recorded in a three-dimensional image file. A 3D image file is read (Step S31), and the size of a display which performs 3D display is acquired (Step S32). The maximum display size capable of appropriately performing 3D display of a viewpoint image is acquired from metadata of the read 3D image file (Step S33). The size acquired in Step S32 is compared with the maximum display size acquired in Step S33 (Step S34). When the maximum display size is smaller, parallax displacement or parallax compression is performed, (Step S35), and then 3D display is performed (Step S36). Therefore, display can be appropriately performed on the basis of the maximum display size.

10 Claims, 44 Drawing Sheets

(51) Int. Cl.
*H04N 9/82* (2006.01)
*H04N 5/77* (2006.01)
*H04N 5/907* (2006.01)
*G06F 3/14* (2006.01)
*H04N 13/00* (2006.01)

(52) U.S. Cl.
CPC .......... *H04N 9/8205* (2013.01); *H04N 9/8227* (2013.01); *H04N 13/0022* (2013.01); *H04N 13/0055* (2013.01); *H04N 13/0066* (2013.01); *H04N 21/4402* (2013.01); *H04N 21/440218* (2013.01); *H04N 21/440263* (2013.01); *G09G 2370/10* (2013.01); *G09G 2370/12* (2013.01); *G09G 2380/00* (2013.01)

(56) References Cited

U.S. PATENT DOCUMENTS

| | | | | |
|---|---|---|---|---|
| 8,736,671 | B2* | 5/2014 | Nakamura | H04N 13/0022 348/43 |
| 2002/0030675 | A1* | 3/2002 | Kawai | H04N 13/0014 345/204 |
| 2002/0122585 | A1* | 9/2002 | Swift | H04N 7/17318 382/154 |
| 2004/0056981 | A1* | 3/2004 | Hamamura | H04N 1/00453 348/578 |
| 2006/0290778 | A1 | 12/2006 | Kitaura et al. | |
| 2007/0257902 | A1 | 11/2007 | Satoh et al. | |
| 2009/0096863 | A1* | 4/2009 | Kim | G06K 9/00604 348/42 |
| 2009/0122134 | A1* | 5/2009 | Joung | H04N 13/0066 348/42 |
| 2009/0245346 | A1* | 10/2009 | Park | H04L 65/607 375/240.01 |
| 2011/0032328 | A1* | 2/2011 | Raveendran | H04N 13/0003 348/43 |
| 2011/0032338 | A1* | 2/2011 | Raveendran | H04N 21/816 348/51 |
| 2011/0116540 | A1* | 5/2011 | O'Connor | H04N 5/44543 375/240.02 |
| 2011/0293170 | A1* | 12/2011 | Hatasawa | G02B 27/22 382/154 |
| 2012/0218256 | A1* | 8/2012 | Murray | G06T 7/0075 345/419 |
| 2013/0010064 | A1* | 1/2013 | Okuda | H04N 13/0022 348/43 |

FOREIGN PATENT DOCUMENTS

| | | |
|---|---|---|
| JP | 2005-73049 A | 3/2005 |
| JP | 2008-109267 A | 5/2008 |

* cited by examiner (CONT.)

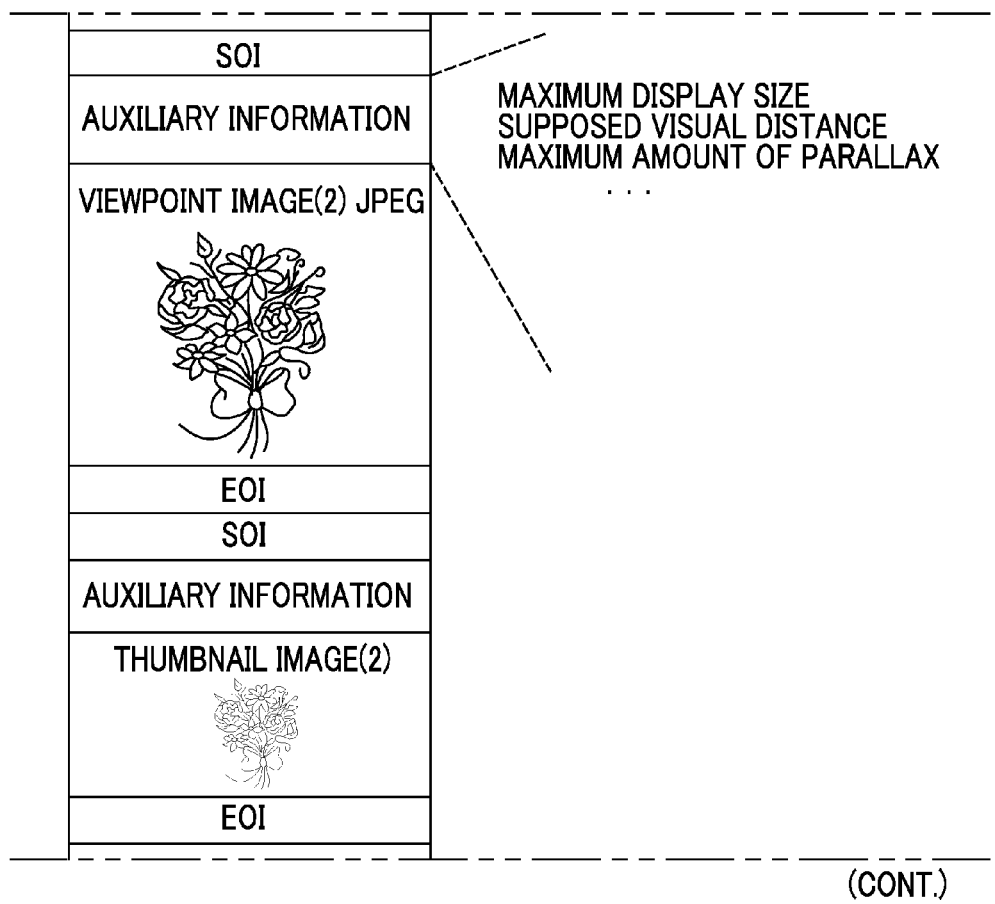

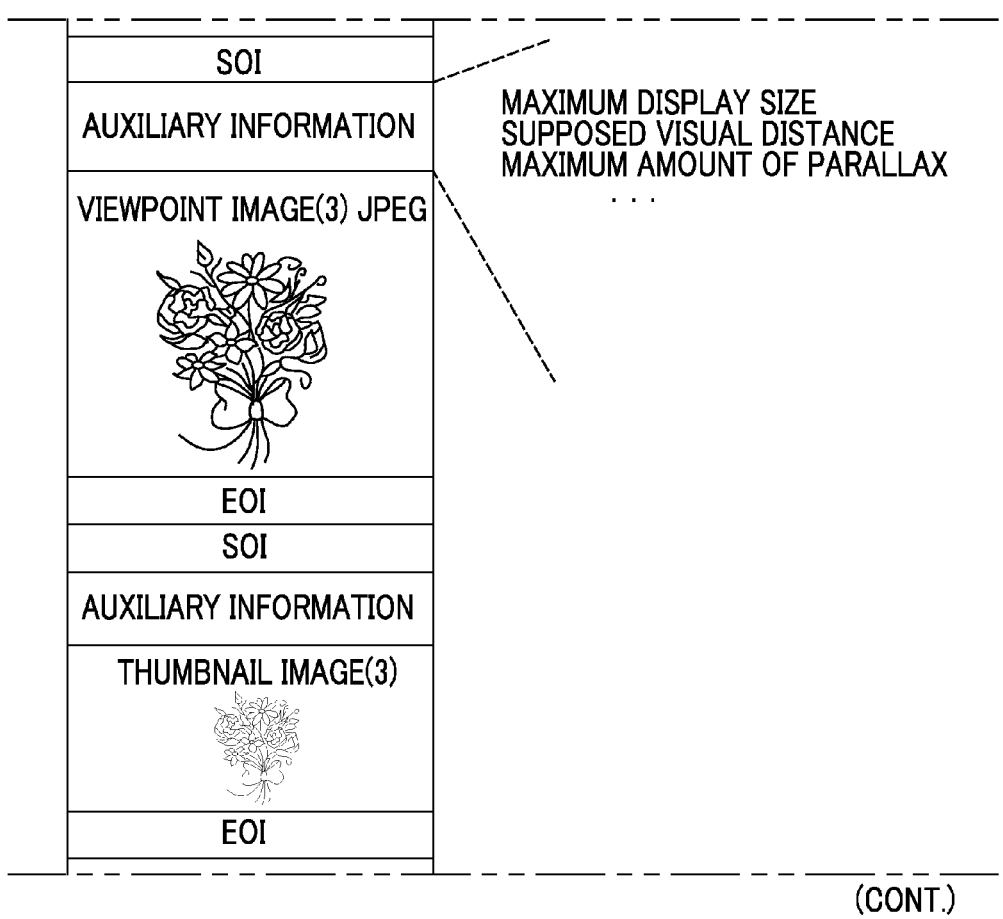

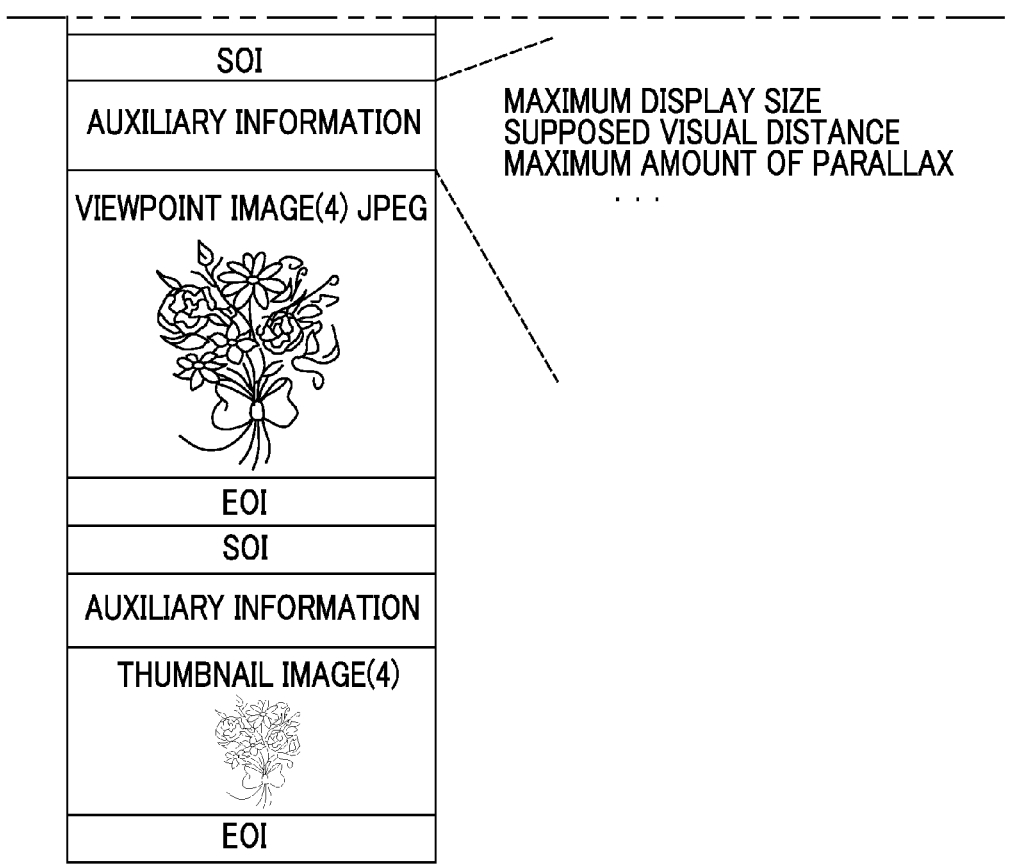

FIG. 7A
| SOI |
| AUXILIARY INFORMATION |
| VIEWPOINT IMAGE(1) JPEG 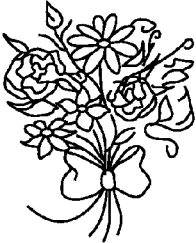 |
| EOI |
| SOI |
| AUXILIARY INFORMATION |
| THUMBNAIL IMAGE(1)  |
| EOI |
| SOI |
| AUXILIARY INFORMATION |
| THUMBNAIL IMAGE(2)  |
| EOI |
| SOI |
| AUXILIARY INFORMATION |
(CONT.)

(FIG. 7A Continued)
| THUMBNAIL IMAGE(3)  |
| --- |
| EOI |
| SOI |
| AUXILIARY INFORMATION |
| THUMBNAIL IMAGE(4)  |
| EOI |
| SOI |
| AUXILIARY INFORMATION |
| VIEWPOINT IMAGE(2) JPEG  |
| EOI |
| SOI |
| AUXILIARY INFORMATION |
(CONT.)

(FIG. 7A Continued)
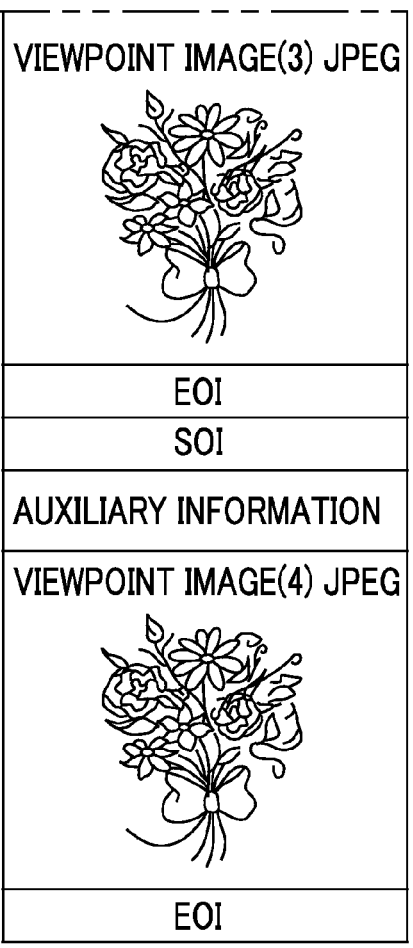

FIG. 7B
| SOI |
| AUXILIARY INFORMATION |
| VIEWPOINT IMAGE(1) JPEG 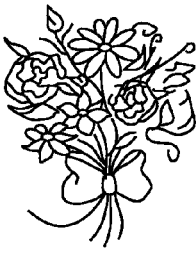 |
| EOI |
| SOI |
| AUXILIARY INFORMATION |
| THUMBNAIL IMAGE(2)  |
| EOI |
| SOI |
| AUXILIARY INFORMATION |
| THUMBNAIL IMAGE(3)  |
| EOI |
| SOI |
| AUXILIARY INFORMATION |
(CONT.)

(FIG. 7B Continued)
| THUMBNAIL IMAGE(1)  |
| --- |
| EOI |
| SOI |
| AUXILIARY INFORMATION |
| THUMBNAIL IMAGE(4)  |
| EOI |
| SOI |
| AUXILIARY INFORMATION |
| VIEWPOINT IMAGE(2) JPEG  |
| EOI |
| SOI |
| AUXILIARY INFORMATION |
(CONT.)

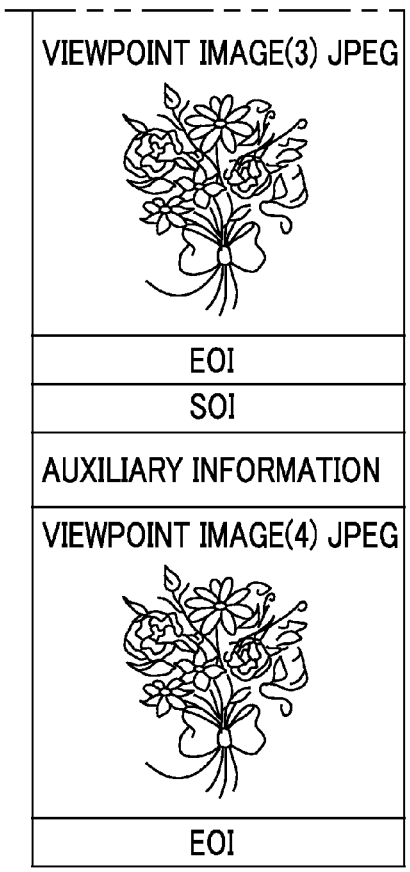
(FIG. 7B Continued)

FIG. 7C
| SOI |
| AUXILIARY INFORMATION |
| VIEWPOINT IMAGE(1) JPEG 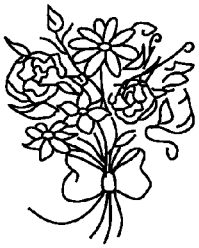 |
| EOI |
| SOI |
| AUXILIARY INFORMATION |
| THUMBNAIL IMAGE(1)  |
| EOI |
| SOI |
| AUXILIARY INFORMATION |
| THUMBNAIL IMAGE(3)  |
| EOI |
| SOI |
| AUXILIARY INFORMATION |
(CONT.)

(FIG. 7C Continued)
| |
|---|
| THUMBNAIL IMAGE(2)  |
| EOI |
| SOI |
| AUXILIARY INFORMATION |
| THUMBNAIL IMAGE(4)  |
| EOI |
| SOI |
| AUXILIARY INFORMATION |
| VIEWPOINT IMAGE(2) JPEG  |
| EOI |
| SOI |
| AUXILIARY INFORMATION |
(CONT.)

(FIG. 7C Continued)
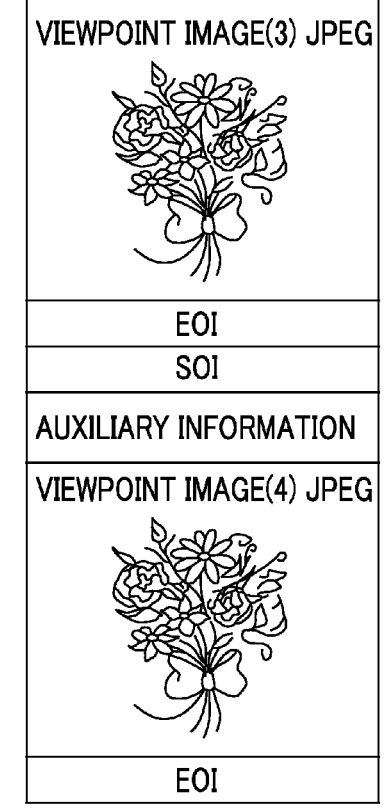

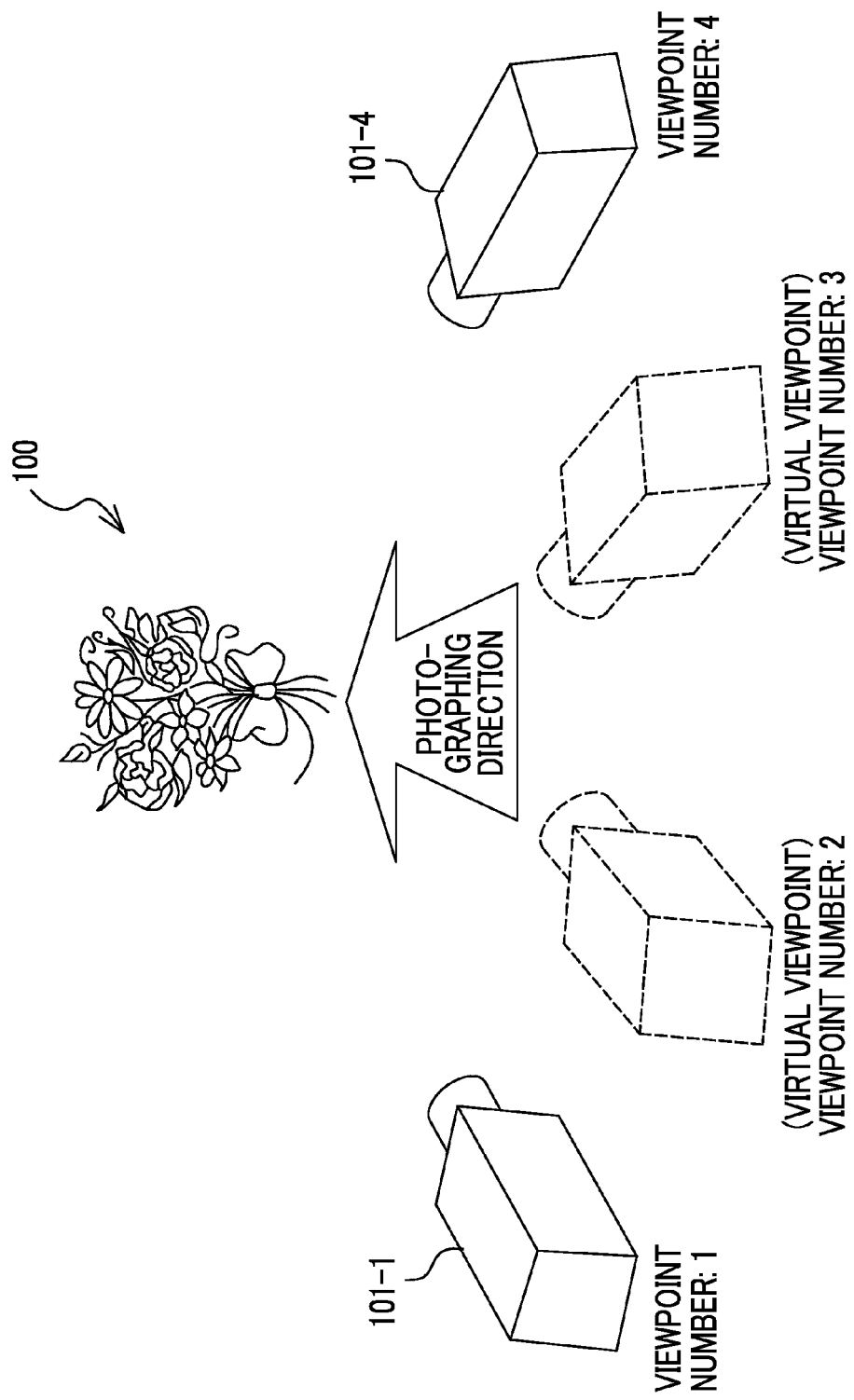

(CONT.)

(FIG. 9A Continued)
| THUMBNAIL IMAGE(1)  |
|---|
| EOI |
| SOI |
| AUXILIARY INFORMATION |
| THUMBNAIL IMAGE(4)  |
| EOI |
| SOI |
| AUXILIARY INFORMATION |
| VIEWPOINT IMAGE(4) JPEG  |
| EOI |

(CONT.)

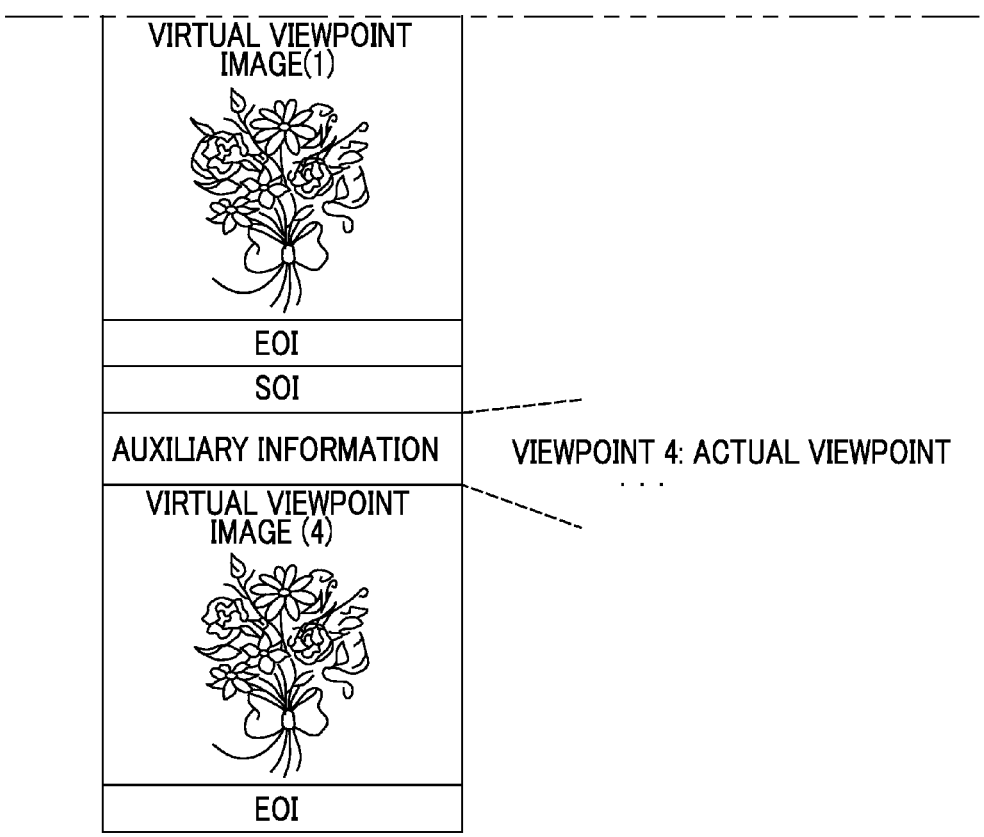

FIG. 13

| AUXILIARY INFORMATION | MAXIMUM AMOUNT OF PARALLAX |
|---|---|
| VIEWPOINT IMAGE(1)  | |
| AUXILIARY INFORMATION | VIEWPOINT 2: SHIFTED SHIFT AMOUNT=xxx |
| VIEWPOINT SHIFT IMAGE(2)  | |
| AUXILIARY INFORMATION | MAXIMUM AMOUNT OF PARALLAX |
| THUMBNAIL IMAGE(1)  | |
| AUXILIARY INFORMATION | |
| THUMBNAIL IMAGE(2)  | |
| AUXILIARY INFORMATION | MAXIMUM AMOUNT OF PARALLAX |
| ORIGINAL IMAGE (1) 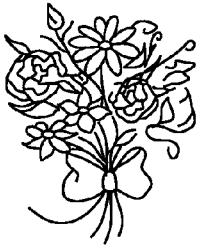 | |
| AUXILIARY INFORMATION | |
| ORIGINAL IMAGE (2) 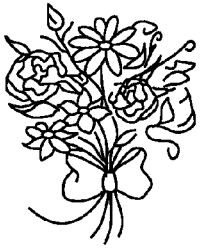 | |

(CONT.)

(FIG. 17A Continued)
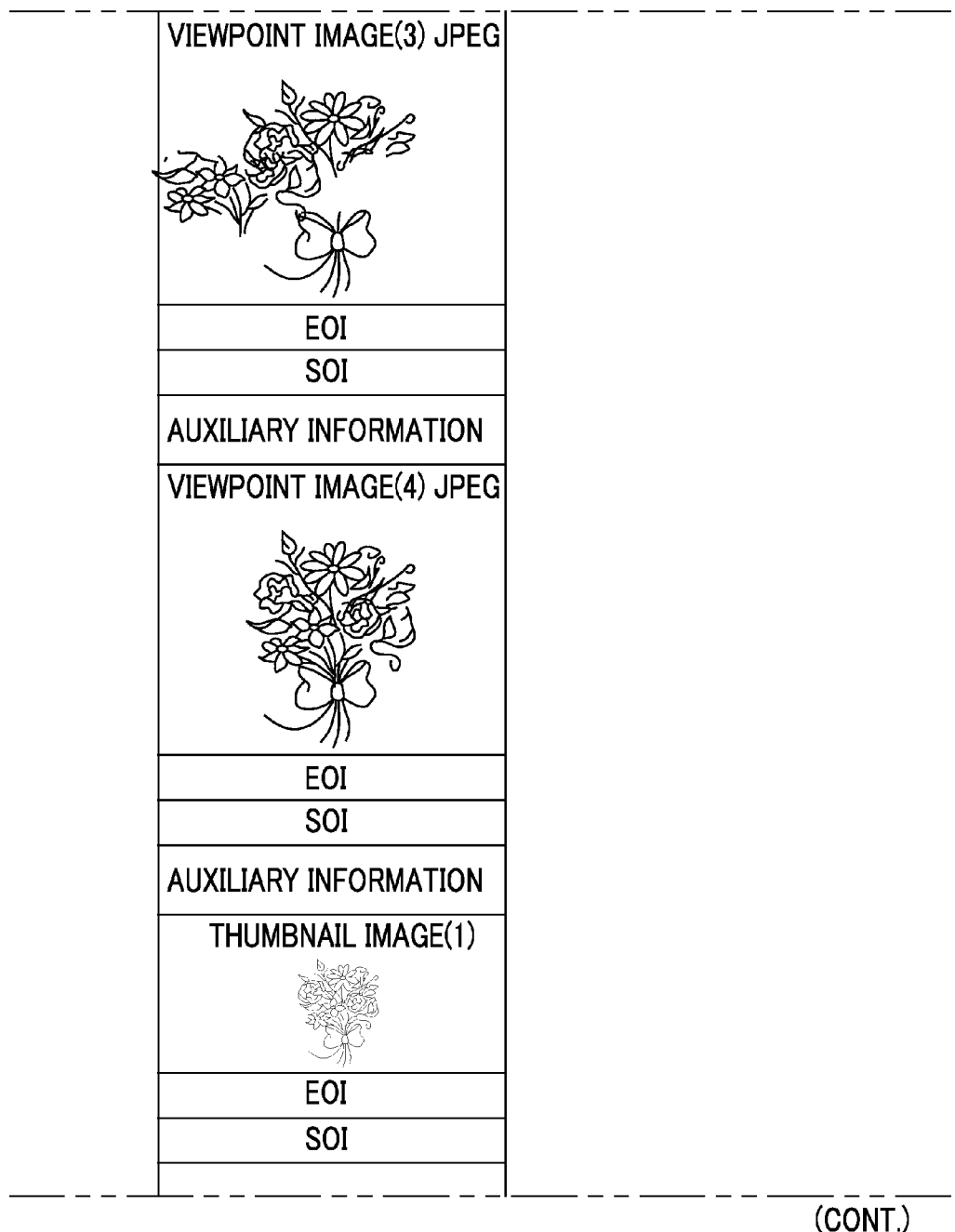
(CONT.)

(FIG. 17A Continued)
| AUXILIARY INFORMATION |
| THUMBNAIL IMAGE(2)  |
| EOI |
| SOI |
| AUXILIARY INFORMATION |
| THUMBNAIL IMAGE(3)  |
| EOI |
| SOI |
| AUXILIARY INFORMATION |
| THUMBNAIL IMAGE(4)  |
| EOI |

(CONT.)

(FIG. 17B Continued)
| VIEWPOINT IMAGE(3) JPEG |
| --- |
|  |
| EOI |
| SOI |
| AUXILIARY INFORMATION |
| VIEWPOINT IMAGE(4) JPEG |
|  |
| EOI |
| SOI |
| AUXILIARY INFORMATION |
| THUMBNAIL IMAGE(1) |
|  |
| EOI |
| SOI |
(CONT.)

(FIG. 17B Continued)
| AUXILIARY INFORMATION |
| THUMBNAIL IMAGE(2)  |
| EOI |
| SOI |
| AUXILIARY INFORMATION |
| THUMBNAIL IMAGE(3)  |
| EOI |
| SOI |
| AUXILIARY INFORMATION |
| THUMBNAIL IMAGE (4) (AFTER PARALLAX DISPLACEMENT)  |
| EOI |
SHIFT AMOUNT

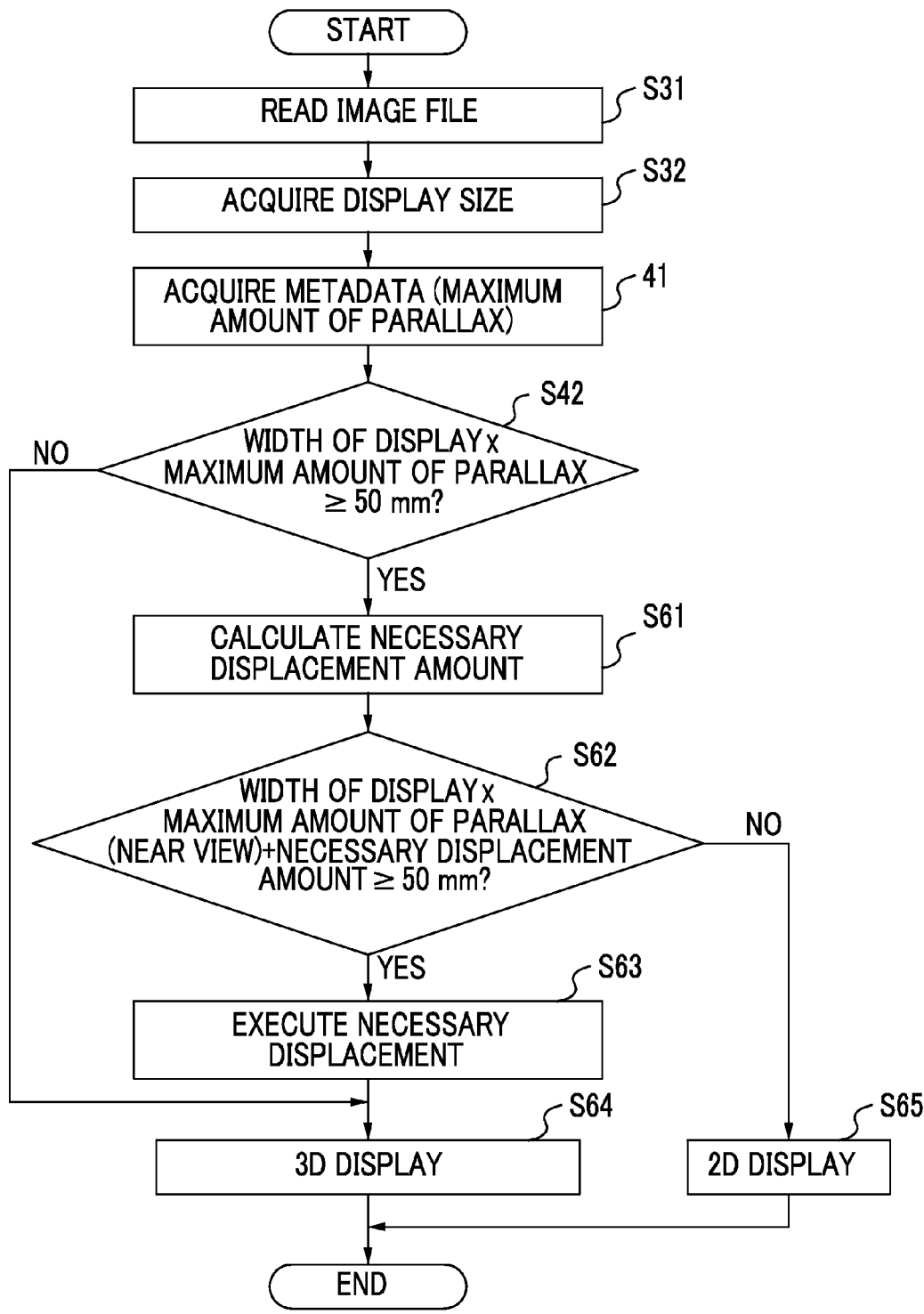

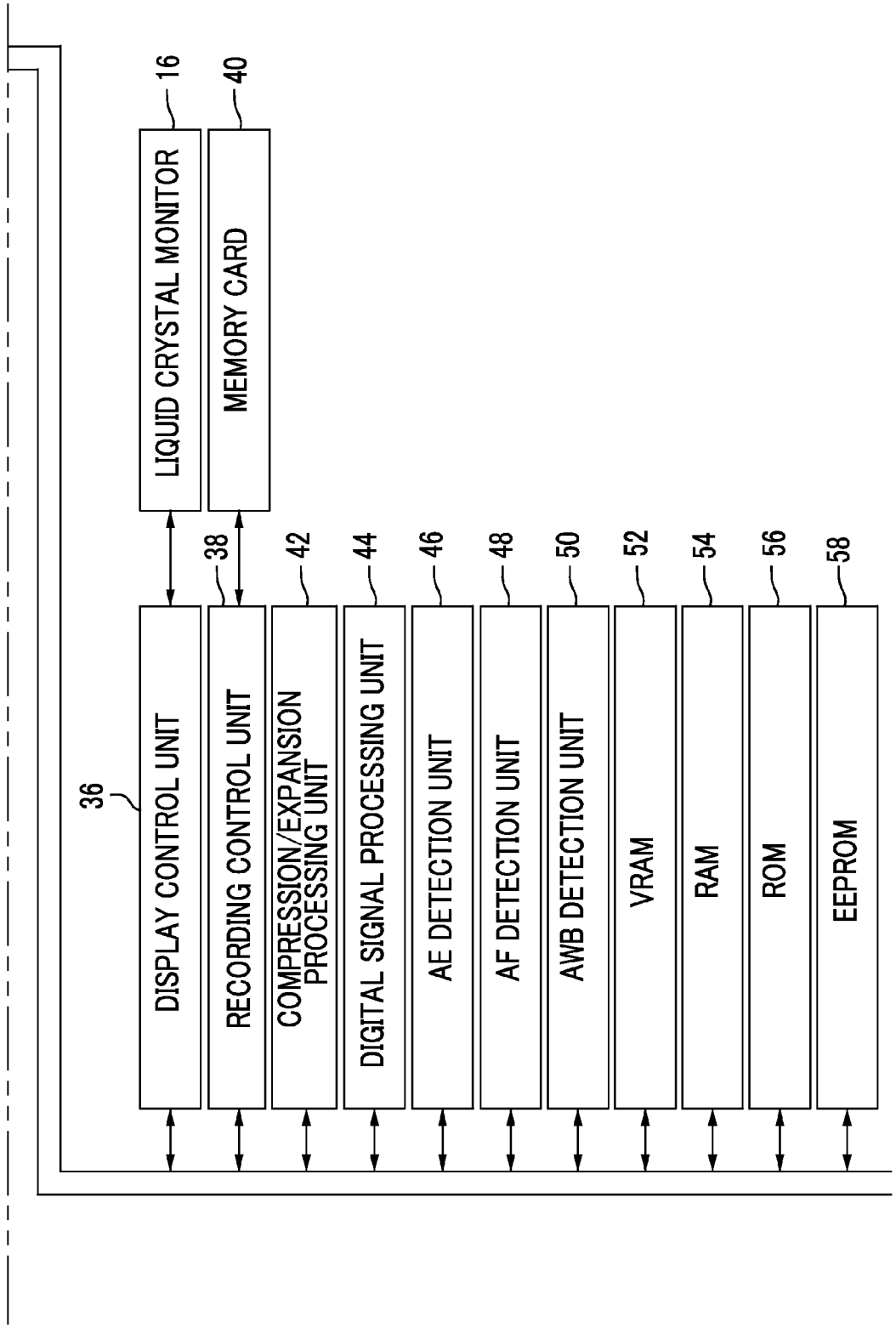

STEREOSCOPIC IMAGE REPRODUCTION DEVICE AND METHOD, STEREOSCOPIC IMAGE CAPTURING DEVICE, AND STEREOSCOPIC DISPLAY DEVICE

CROSS REFERENCE TO RELATED APPLICATIONS

This non-provisional application is a Continuation of International Application No. PCT/JP2011/060095 filed on Apr. 25, 2011, which claims the benefit of Patent Application No. 2010-103905 filed in Japan, on Apr. 28, 2010. The entire contents of all of the above applications are hereby incorporated by reference.

BACKGROUND OF THE INVENTION

1. Field of the Invention

The present invention relates to a stereoscopic image reproduction device and method, a stereoscopic image capturing device, and a stereoscopic display device, and in particular, to a technique for appropriately reproducing and displaying a stereoscopic image recorded in a three-dimensional image file.

2. Description of the Related Art

A stereoscopic image capturing device photographs the same subject from left and right viewpoints using two image capturing units (image capturing part) arranged left and right with parallax, acquires an image for a left eye and an image for a right eye, and records the images in a recording medium. The acquired left and right images are read from the recording medium, are input to a 3D display which can perform three-dimensional (3D) display, and are displayed such that the image for the left eye and the image for the right eye are visible separately with the left and right eyes. In this way, the images can be recognized as a stereoscopic image.

On the other hand, the 3D displays have various screen sizes, and the amount of parallax of the recorded left and right image may not be appropriate for the size of the 3D display on which the left and right images are reproduced and displayed. In this case, the degree of protrusion or recession becomes excessive, and there is a problem in that the images may not be recognized as a natural stereoscopic image.

In regard to this problem, in a reproduction device, an intermediate viewpoint image which should be viewed from an arbitrary viewpoint is generated from an image for a left eye and an image for a right eye. In this way, in order to generate an intermediate viewpoint image from a plurality of images of different viewpoints, it is necessary to obtain pixel correspondence between the images to estimate the depth.

However, there is a problem in that, when display is performed without causing eye fatigue (for example, parallax control), a depth range is not known. When performing such display, it is necessary to appropriately determine an observation distance along with the conditions of the viewing angle or the size of an imaging surface during photographing, the distance between the lens center and the imaging surface, and the like.

In order to solve this problem, JP2003-333621A discloses a technique in which information regarding the imaging size of a camera capturing an image and the distance between the lens center and the imaging surface is transmitted in the transmission of images of two or more viewpoints. According to this technique, information regarding the viewing angle during imaging can be obtained on the display side.

SUMMARY OF THE INVENTION

However, in the technique of JP2003-333621A, there is a problem in that processing on the display device is complicated. Furthermore, since the technique relates to data transmission, when a stereoscopic image is recorded in a recording medium, how information is recorded is not disclosed.

The invention has been accomplished in consideration of this situation, and an object of the invention is to provide a stereoscopic image reproduction device and method, a stereoscopic image capturing device, and a stereoscopic display device which display a stereoscopic image with an appropriate amount of parallax on the basis of auxiliary information recorded in a three-dimensional image file.

In order to attain the above-described object, a stereoscopic image reproduction device according to a first aspect of the invention includes first acquisition part for reading a three-dimensional image file having recorded therein a plurality of viewpoint images for stereoscopic vision and auxiliary information for the plurality of viewpoint images, the auxiliary information including the maximum display size enabling binocular fusion when the plurality of viewpoint images are displayed on a stereoscopic display, and acquiring the plurality of viewpoint images and the auxiliary information from the three-dimensional image file, second acquisition part for acquiring the display size of the stereoscopic display as an output destination, determination part for comparing the acquired display size of the stereoscopic display with the maximum display size and determining whether or not the display size of the stereoscopic display is greater than the maximum display size, image processing part for generating a plurality of viewpoint images with smaller parallax on at least a distant view side between the plurality of viewpoint images on the basis of the plurality of viewpoint images acquired by the first acquisition part if it is determined that the display size of the stereoscopic display is greater than the maximum display size, and output part for outputting the viewpoint images generated by the image processing part to the stereoscopic display if the determination part determines that the display size of the stereoscopic display is greater than the maximum display size and outputting the viewpoint images acquired by the first acquisition part to the stereoscopic display if it is determined that the display size of the stereoscopic display is equal to or smaller than the maximum display size. The term "distant view side" used herein refers to a distal side away from the image capturing means toward the subject, and the term "near view side" refers to a proximal side close to the image capturing part from the subject contrary to the distal side.

According to the first aspect of the invention, the display size of the stereoscopic display is compared with the maximum display size acquired from the three-dimensional image file, and if it is determined that the display size of the stereoscopic display is greater, a plurality of viewpoint images with smaller parallax on at least the distant view side are generated and output to the stereoscopic display. Therefore, a stereoscopic image can be displayed with an appropriate amount of parallax.

In order to attain the above-described object, a stereoscopic image reproduction device according to a second aspect of the invention includes first acquisition part for reading a three-dimensional image file having recorded therein a plurality of viewpoint images for stereoscopic vision and auxiliary information including the maximum amount of parallax on a distant view side in the plurality of viewpoint images, and acquiring the plurality of viewpoint images and the auxiliary information from the three-dimensional image file, second acquisition part for acquiring the display size of a stereoscopic display as an output destination, determination part for determining whether or not binocular fusion is enabled when a plurality of viewpoint images are displayed on the stereoscopic display on the basis of the acquired maximum amount of parallax on the distant view side, the display size of the stereoscopic display, and a predetermined value representing an interocular distance of a person, image processing part for generating a plurality of viewpoint images with smaller parallax on the distant view side between the a plurality of viewpoint images on the basis of the plurality of viewpoint images acquired by the first acquisition part if the determination part determined that binocular fusion is disabled, and output part for outputting the viewpoint images generated by the image processing part to the stereoscopic display if the determination part determines that binocular fusion is disabled and outputting the viewpoint images acquired by the first acquisition part to the stereoscopic display if it is determined that binocular fusion is enabled.

According to the second aspect of the invention, it is determined whether or not binocular fusion is enabled when a plurality of viewpoint images acquired from the three-dimensional image file are displayed on the stereoscopic display on the basis of the maximum amount of parallax on at least the distant view side acquired from the three-dimensional image file, the display size of the stereoscopic display, and the predetermined value representing the interocular distance of the person, and when it is determined that binocular fusion is disabled, a plurality of viewpoint images with smaller parallax on at least the distant view side are generated and output to the stereoscopic display. Therefore, a stereoscopic image can be displayed with an appropriate amount of parallax.

In the stereoscopic image reproduction device according to the second aspect of the invention, it is preferable that the determination part has image deviation amount calculation part for calculating the amount of image deviation on the stereoscopic display corresponding to the maximum amount of parallax when the plurality of viewpoint images are displayed on the stereoscopic display on the basis of the acquired maximum amount of parallax on the distant view side and the display size of the stereoscopic display, and determines whether or not binocular fusion is enabled depending on whether or not the calculated amount of image deviation exceeds the predetermined value representing the interocular distance of the person.

Accordingly, it is possible to appropriately determine whether or not binocular fusion is enabled.

In the stereoscopic image reproduction device according to the first and second aspects of the invention, it is preferable that the image processing part performs parallax displacement between the plurality of viewpoint images such that the maximum amount of parallax on the distant view side of the plurality of viewpoint images on the stereoscopic display is equal to or smaller than a predetermined value representing an interocular distance of a person, and generating viewpoint shift images subjected to the parallax displacement.

Accordingly, viewpoint images can be appropriately generated.

In the stereoscopic image reproduction device according to the first and second aspects of the invention, it is preferable that the auxiliary information of the three-dimensional image file includes the maximum amount of parallax on a near view side in the plurality of viewpoint images, the stereoscopic image reproduction device further includes addition part for adding the maximum amount of parallax on the near view side of the plurality of viewpoint images on the stereoscopic display and the amount of deviations of the viewpoint shift images on the stereoscopic display, and determination part for determining whether or not the amount of image deviation corresponding to the added maximum amount of parallax on the near view side exceeds a binocular fusion limit when being displayed on the stereoscopic display, and if the determination part determines that the amount of image deviation exceeds the binocular fusion limit, the output part outputs one of the plurality of viewpoint images acquired by the first acquisition part to the stereoscopic display to display a two-dimensional image.

Accordingly, appropriate images can be displayed.

In the stereoscopic image reproduction device according to the first and second aspects of the invention, it is preferable that the image processing part has parallax amount calculation part for calculating the amount of parallax representing the amount of deviation between feature points having common features from the plurality of viewpoint images acquired by the first acquisition part, and virtual viewpoint image generation part for generating one or a plurality of virtual viewpoint images corresponding to an arbitrary virtual viewpoint on the basis of at least one viewpoint image from the plurality of viewpoint images acquired by the first acquisition part and the amount of parallax calculated by the parallax amount calculation part.

Accordingly, appropriate viewpoint images can be generated.

At this time, in the stereoscopic image reproduction device according to the first and second aspects of the invention, it is preferable that the output part outputs one of the plurality of viewpoint images acquired by the first acquisition part to the stereoscopic display to display a two-dimensional image if the determination part determines that the display size of the stereoscopic display is greater than the maximum display size or if the calculated amount of image deviation exceeds a predetermined value representing an interocular distance of a person, and outputs the virtual viewpoint images instead of the two-dimensional image if the virtual viewpoint images are generated by the image processing part.

Accordingly, even when the generation of the virtual viewpoint images requires a lot of time, images can be displayed on the stereoscopic display.

It is preferable that the stereoscopic image reproduction device according to the first and second aspects of the invention further includes display image generation part for generating a plurality of display images of size smaller than the viewpoint images on the basis of the plurality of viewpoint images, wherein the image processing part generates a plurality of display images with smaller parallax on at least the distant view side between the plurality of display images using the plurality of generated display images instead of the plurality of viewpoint images acquired by the first acquisition part, and the output part outputs the display images generated by the display image generation part or the display images generated by the image processing part to the stereoscopic display.

Accordingly, images of appropriate size can be output to the stereoscopic display.

It is preferable that the stereoscopic image reproduction device according to the first and second aspects of the invention further includes recording part for adding or overwriting at least one of the viewpoint images generated by the image processing part and the display images generated by the display image generation part to the three-dimensional image file.

Accordingly, images with an appropriate amount of parallax can be displayed during the next display without image processing.

In order to attain the above-described object, a stereoscopic image capturing device according to a third aspect of the invention includes image capturing part for acquiring a plurality of viewpoint images of the same subject from a plurality of viewpoints, parallax amount calculation part for calculating the amount of parallax representing the amount of displacement between feature points having common features from the plurality of acquired viewpoint images, maximum parallax amount acquisition part for acquiring the maximum amount of parallax on a distant view side from the calculated amount of parallax of each feature point, maximum display size acquisition part for acquiring the maximum display size enabling binocular fusion when a stereoscopic image based on the plurality of viewpoint images is displayed on a stereoscopic display on the basis of the acquired maximum amount of parallax on the distant view side, recording part for generating a three-dimensional image file in which the plurality of viewpoint images are recorded, and recording the three-dimensional image file in a recording medium, the recording part recording the plurality of viewpoint images in the three-dimensional image file and also recording the maximum amount of parallax on the distant view side and the maximum display size in the three-dimensional image file as auxiliary information, and the above-described stereoscopic image reproduction device.

Accordingly, a stereoscopic image can be displayed with an appropriate amount of parallax.

In order to attain the above-described object, a stereoscopic display device according to a fourth aspect of the invention includes a stereoscopic display as an output destination, and the above-described stereoscopic image reproduction device.

Accordingly, a stereoscopic image can be displayed with an appropriate amount of parallax.

In order to attain the above-described object, a stereoscopic image reproduction method according to a fifth aspect of the invention includes first acquisition part for reading a three-dimensional image file having recorded therein a plurality of viewpoint images for stereoscopic vision and auxiliary information for the plurality of viewpoint images, the auxiliary information including the maximum display size enabling binocular fusion when the plurality of viewpoint images are displayed on a stereoscopic display, and acquiring the plurality of viewpoint images and the auxiliary information from the three-dimensional image file, a second acquisition step of acquiring the display size of the stereoscopic display as an output destination, a determination step of comparing the acquired display size of the stereoscopic display with the maximum display size and determining whether or not the display size of the stereoscopic display is greater than the maximum display size, an image processing step of generating a plurality of viewpoint images with smaller parallax on at least a distant view side between the plurality of viewpoint images on the basis of the plurality of viewpoint images acquired in the first acquisition step if it is determined that the display size of the stereoscopic display is greater than the maximum display size, and an output step of outputting the viewpoint images generated in the image processing step to the stereoscopic display if it is determined in the determination step that the display size of the stereoscopic display is greater than the maximum display size and outputting the viewpoint images acquired in the first acquisition step to the stereoscopic display if it is determined that the display size of the stereoscopic display is equal to or smaller than the maximum display size.

In order to attain the above-described object, a stereoscopic image reproduction method according to a sixth aspect of the invention includes a first acquisition step of reading a three-dimensional image file having recorded therein a plurality of viewpoint images for stereoscopic vision and auxiliary information for the plurality of viewpoint images, the auxiliary information including the maximum amount of parallax on a distant view side in the plurality of viewpoint images, and acquiring the plurality of viewpoint images and the auxiliary information from the three-dimensional image file, a second acquisition step of acquiring the display size of a stereoscopic display as an output destination, a determination step of determining whether or not binocular fusion is enabled when a plurality of viewpoint images are displayed on the stereoscopic display on the basis of the acquired maximum amount of parallax on the distant view side, the display size of the stereoscopic display, and a predetermined value representing an interocular distance of a person, an image processing step of generating a plurality of viewpoint images with smaller parallax on at least the distant view side between the plurality of viewpoint images on the basis of the plurality of viewpoint images acquired in the first acquisition step if it is determined in the determination step that binocular fusion is disabled, and an output step of outputting the viewpoint images generated in the image processing step to the stereoscopic display if it is determined in the determination step that binocular fusion is disabled and outputting the viewpoint images acquired in the first acquisition step to the stereoscopic display if it is determined that binocular fusion is enabled.

According to the invention, a stereoscopic image with an appropriate amount of parallax can be displayed on the basis of auxiliary information recorded in a three-dimensional image file.

BRIEF DESCRIPTION OF THE DRAWINGS

FIGS. 7A to 7C are diagrams schematically showing another form of the data structure of a 3D image file.

FIG. 8 is a diagram illustrating a virtual viewpoint.

FIG. 13 is a diagram schematically showing the data structure of a 3D image file.

FIG. 19 is a flowchart showing processing taking into consideration the maximum amount of parallax (near view).

DESCRIPTION OF THE PREFERRED EMBODIMENTS

Figure 1:
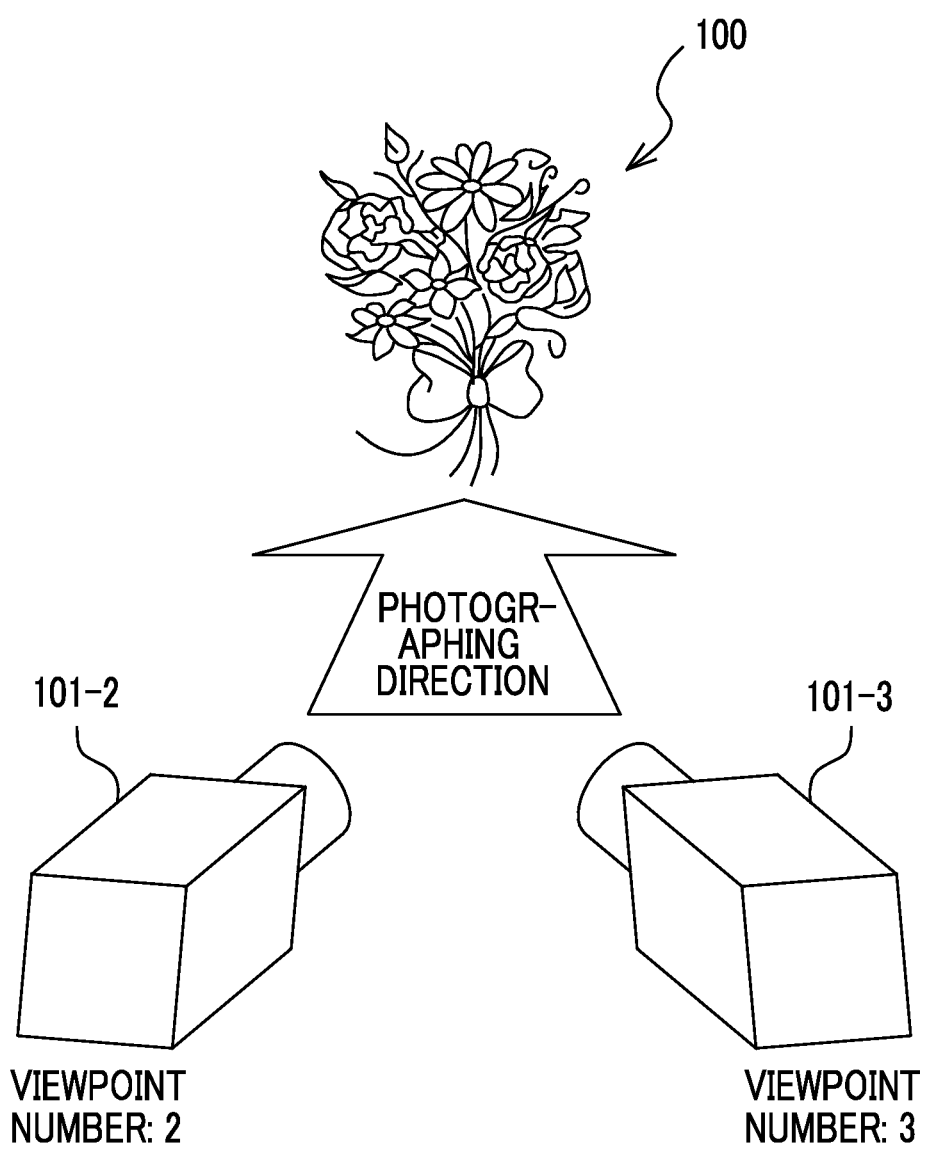
FIG. 1 is a diagram showing a condition in which two viewpoint images are photographed.

A stereoscopic image reproduction device of the invention includes first acquisition part, second acquisition part, determination part, image processing part, and output part. First, the first acquisition part reads a three-dimensional image file having recorded therein a plurality of viewpoint images for stereoscopic vision and auxiliary information for the plurality of viewpoint images, auxiliary information including the maximum display size enabling binocular fusion when the plurality of viewpoint images are displayed on a stereoscopic display, and acquires the plurality of viewpoint images and the auxiliary information from the three-dimensional image file (first acquisition step). The second acquisition part acquires the display size of the stereoscopic display as an output destination (second acquisition step). Thereafter, the determination part compares the acquired display size of the stereoscopic display with the maximum display size to determine whether or not the display size of the stereoscopic display is greater than the maximum display size (determination step). The image processing part generates a plurality of viewpoint images with smaller parallax on at least a distant view side between the plurality of viewpoint images on the basis of the plurality of viewpoint images which are determined that the display size of the stereoscopic display is greater than the maximum display size and acquired by the first acquisition part (image processing step). Finally, the output part outputs the viewpoint images generated by the image processing part to the stereoscopic display, and outputs the viewpoint images acquired by the first acquisition part to the stereoscopic display if it is determined that the display size of the stereoscopic display is equal to or smaller than the maximum display size (output step). With the above-described configuration, the display size of the stereoscopic display is compared with the maximum display size acquired from the three-dimensional image file, and when it is determined that the display size of the stereoscopic display is greater, a plurality of viewpoint images with smaller parallax on at least the distant view side can be generated and output to the stereoscopic display. As a result, it becomes possible to display a stereoscopic image with an appropriate amount of parallax.

Alternatively, after the first acquisition part acquires the plurality of viewpoint images and the auxiliary information, and the second acquisition part acquires the display size of the stereoscopic display as an output destination, it is determined whether or not binocular fusion is enabled when a plurality of viewpoint images are displayed on the stereoscopic display on the basis of the maximum amount of parallax on the distance view side acquired by the determination part, the display size of the stereoscopic display, and a predetermined value representing an interocular distance of a person. If the determination part determines that binocular fusion is disabled, a plurality of viewpoint images with smaller parallax on at least the distance view side between the plurality of viewpoint images are generated on the basis of the plurality of viewpoint images acquired by the first acquisition part using the image processing part. Thereafter, the output part outputs the viewpoint images generated by the image processing part to the stereoscopic display if the determination part determines that binocular fusion is disabled and outputs the viewpoint images acquired by the first acquisition part to the stereoscopic display if it is determined that binocular fusion is enabled. With this, it is determined whether or not binocular fusion is enabled when a plurality of viewpoint images acquired from the three-dimensional image file are displayed on the stereoscopic display on the basis of the maximum amount of parallax on at least the distant view side acquired from the three-dimensional image file, the display size of the stereoscopic display, and the predetermined value representing the interocular distance of the person, and when it is determined that binocular fusion is disabled, it becomes possible to generate a plurality of viewpoint images with smaller parallax on at least the distant view side and to output a plurality of viewpoint images to the stereoscopic display. As a result, a stereoscopic image can be displayed with an appropriate amount of parallax. At this time, it is preferable that the determination part has image deviation amount calculation part for calculating the amount of image deviation on the stereoscopic display corresponding to the maximum amount of parallax when a plurality of viewpoint images are displayed on the stereoscopic display on the basis of the acquired maximum amount of parallax on the distant view side and the display size of the stereoscopic display, and it is determined whether or not binocular fusion is enabled depending on whether or not the calculated amount of image deviation exceeds the predetermined value representing the interocular distance of the person. This is because it becomes possible to appropriately determine whether or not binocular fusion is enabled.

In various stereoscopic image reproduction devices described above, it is preferable that the image processing part performs parallax displacement between the plurality of viewpoint images such that the maximum amount of parallax on the distant view side of the plurality of viewpoint images on the stereoscopic display is equal to or smaller than the predetermined value representing the interocular distance of the person, and generates viewpoint shift images subjected to the parallax displacement. This is because it becomes possible to appropriately generate viewpoint images. It is preferable that the auxiliary information of the three-dimensional image file includes the maximum amount of parallax on the near view side in the plurality of viewpoint images, the stereoscopic image reproduction device further includes addition part for adding the maximum amount of parallax on the near view side of the plurality of viewpoint images on the stereoscopic display and the amount of deviations of the viewpoint shift images on the stereoscopic display, and determination part for determining whether or not the amount of image deviation corresponding to the added maximum amount of parallax on the near view side exceeds a binocular fusion limit when being displayed on the stereoscopic display, and if the determination part determines that the amount of image deviation exceeds the binocular fusion limit, the output part outputs one of the plurality of viewpoint images acquired by the first acquisition part to the stereoscopic display to display a two-dimensional image. This is because it becomes possible to display appropriate images. It is preferable that the image processing part includes parallax amount calculation part for calculating the amount of parallax representing the amount of deviation between feature points having common features from the plurality of viewpoint images acquired by the first acquisition part, and virtual viewpoint image generation part for generating one or a plurality of virtual viewpoint images corresponding to an arbitrary virtual viewpoint on the basis of at least one viewpoint image from the plurality of viewpoint images acquired by the first acquisition part and the amount of parallax calculated by the parallax amount calculation part. This is because it becomes possible to generate appropriate viewpoint images. At this time, it is preferable that the output part outputs one of the plurality of viewpoint images acquired by the first acquisition part to the stereoscopic display to display a two-dimensional image if the determination part determines that the display size of the stereoscopic display is greater than the maximum display size or if the calculated amount of image deviation exceeds a predetermined value representing an interocular distance of a person, and outputs the virtual viewpoint images instead of the two-dimensional image if the virtual viewpoint images are generated by the image processing part. This is because, even when the generation of the virtual viewpoint images requires a lot of time, it becomes possible to display images on the stereoscopic display. It is preferable that the stereoscopic image reproduction device further includes display image generation part for generating a plurality of display images of size smaller than the viewpoint images on the basis of the plurality of viewpoint images, wherein the image processing part generates a plurality of display images with smaller parallax on at least the distant view side between the plurality of display images using the plurality of generated display images instead of the plurality of viewpoint images acquired by the first acquisition part, and the output part outputs the display images generated by the display image generation part or the display images generated by the image processing part to the stereoscopic display. This is because it becomes possible to output images of appropriate size to the stereoscopic display. It is preferable that the stereoscopic image reproduction device further includes recording part for adding or overwriting at least one of the viewpoint images generated by the image processing part and the display images generated by the display image generation part to the three-dimensional image file. This is because it becomes possible to display images with an appropriate amount of parallax without performing image processing during the next display.

Hereinafter, preferred embodiments of the invention will be described with reference to the accompanying drawings.

First Embodiment

A 3D image file according to a first embodiment will be described.

Figure 2:
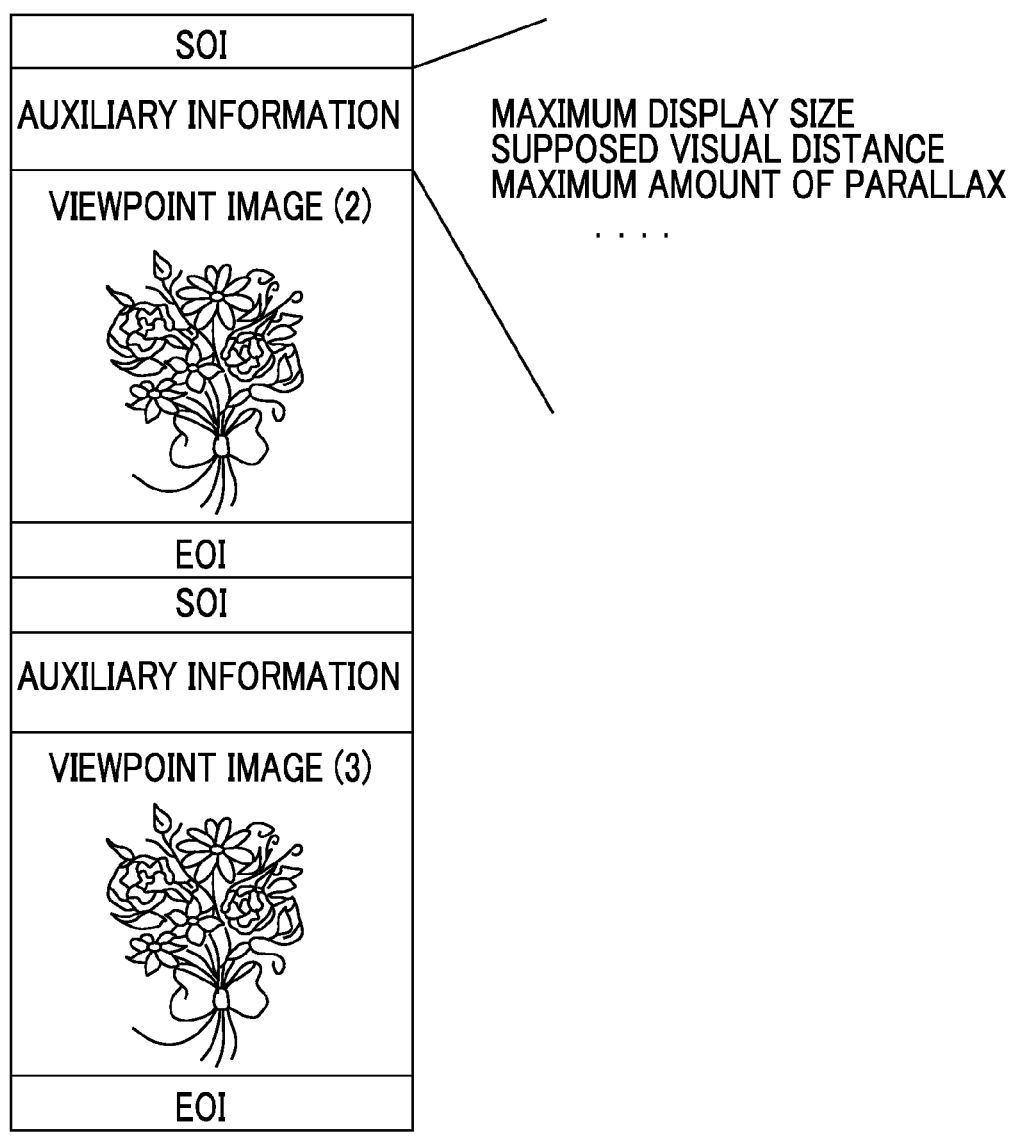
FIG. 2 is a diagram schematically showing the data structure of a 3D image file.

FIG. 1 is a diagram showing a condition in which two viewpoint images are photographed from different viewpoints with respect to a subject 100 using image capturing part of two 2 image capturing devices 101-2 and 101-3 (image capturing step). FIG. 2 is a diagram schematically showing the data structure of a 3D image file in which two viewpoint images 201-2 and 201-3 photographed by the image capturing part of the image capturing devices 101-2 and 101-3 shown in FIG. 1 are recorded.

The 3D image file shown in FIG. 2 is an MP file based on an MP format, and a plurality of viewpoint images of the same subjects are connected and collected in one file. In each of the connected viewpoint images, an SOI (Start of Image) marker is recorded at the top of data, and an EOI (End of Image) marker is recorded at the end of data. Accordingly, the read start position and end position of each image can be recognized.

Each piece of viewpoint image data has an image region and an auxiliary information region. In the auxiliary information region, in addition to Exif auxiliary information having photographing device information, information regarding a photographing mode, and the like, in this embodiment, auxiliary information including a maximum display size (width and height, unit: mm) acquired during image recording, a visual distance (the distance between a viewer who observes a stereoscopic image and a display) (unit: mm) supposed during image recording, a maximum amount of parallax (near view) (%), a maximum amount of parallax (distant view) (%), a convergence angle of a device photographing each viewpoint image, a base line length, an image capturing unit arrangement (viewpoint number), and the number of times of photographing when each viewpoint image is acquired is recorded.

Figure 3:
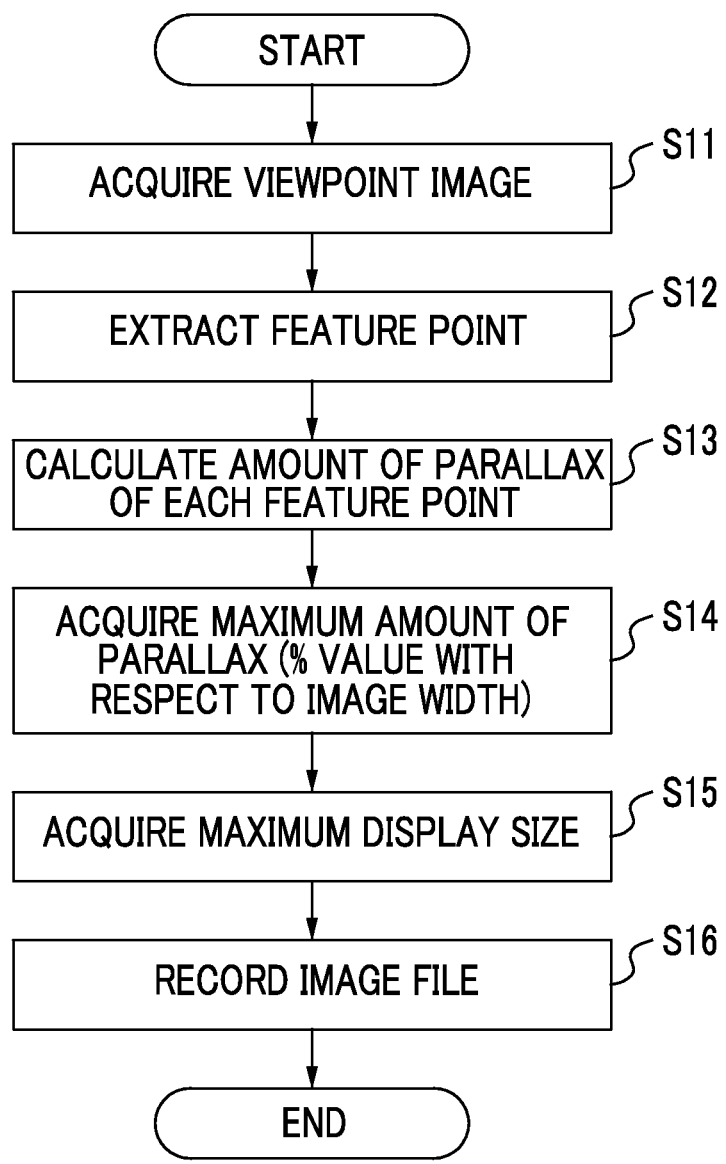
FIG. 3 is a flowchart showing photographing and recording processing.

Photographing and recording processing for recording such a 3D image file will be described with reference to the flowchart of FIG. 3.

First, a plurality of viewpoint images are acquired (Step S11). Here, as shown in FIG. 1, photographing is performed using the two image capturing devices 101-2 and 101-3 one by one with respect to the subject 100 to acquire the two viewpoint images 201-2 and 201-3. Note that the image capturing device 101-2 has a viewpoint number 2, and the image capturing device 101-3 has a viewpoint number 3.

Next, a plurality of feature points are extracted from the two viewpoint images 201-2 and 201-3 using parallax amount calculation part (Step S12), and the amount of parallax of each feature point is calculated (Step S13). Here, the amount of parallax indicates the difference in the distance from the left end of each viewpoint image of the corresponding feature points between the viewpoint images, and the unit is pixel. The maximum amount of parallax on the distant view side and the maximum amount of parallax on the near view side are acquired from the calculated amount of parallax of each feature point using maximum parallax amount acquisition part (Step S14).

Figure 4A:
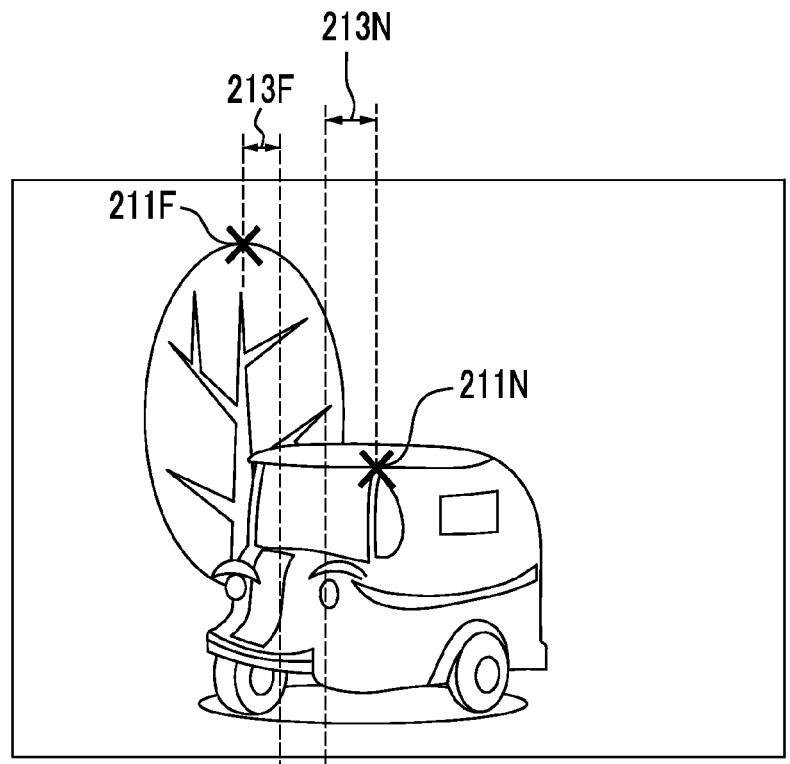
FIGS. 4A and 4B are diagrams showing an example of two viewpoint images.
Figure 4B:
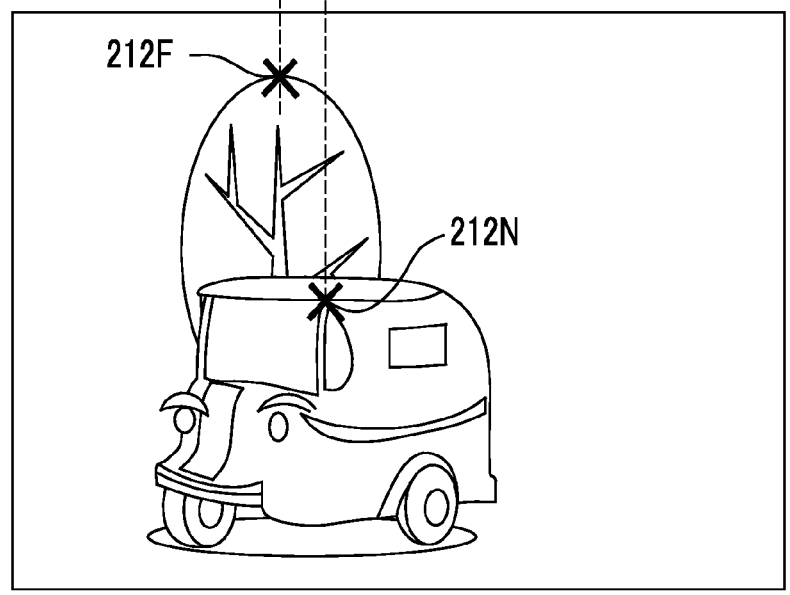

FIGS. 4A and 4B are diagrams showing an example of two viewpoint images. FIG. 4A shows a left viewpoint image 201-2, and FIG. 4B shows a right viewpoint image 201-3.

In the example of FIGS. 4A and 4B, the maximum amount of parallax on the near view side is 213N, and the feature point (the position of the maximum amount of parallax (near view)) having this amount of parallax is 211N and 212N. The maximum amount of parallax on the distant view side is 213F, and the feature point (the position of the maximum amount of parallax (distant view)) having this amount of parallax is 211F and 212F. That is, when stereoscopic vision of a stereoscopic image based on the two viewpoint images 201-2 and 201-3 is achieved, the position of the maximum amount of parallax (near view) is viewed most closely, and the position of the maximum amount of parallax (distant view) is viewed most distantly.

The ratios (%) of the maximum amount of parallax 213N on the near view side and the maximum amount of parallax 213F on the distant view side with respect to the image width become a maximum amount of parallax (near view) (%) and a maximum amount of parallax (distant view) (%).

The maximum display size is acquired on the basis of the calculated maximum amount of parallax using the maximum display size acquisition part (Step S15). If the amount of parallax on the distant view side exceeds the interocular distance of a person, binocular fusion is disabled at the position of the image, and stereoscopic vision cannot be achieved. Accordingly, the maximum display size of which parallax does not exceed the interocular distance of the person is acquired from the ratio (%) of the maximum amount of parallax (distant view) with respect to the image width calculated in Step S14.

For example, if it is assumed that the interocular distance of the person is 50 mm, and the ratio of the maximum amount of parallax (distant view) with respect to the image width is 10%, the maximum display width which is allowed for stereoscopic vision becomes 500 mm. That is, in the case of a display having a width equal to or smaller than 500 mm, display is performed such that the amount of parallax of the maximum parallax position (distant view) does not exceed the interocular distance 50 mm, and as a result, the viewer can view stereoscopic vision. When a display having an aspect ratio of 16:9 is assumed, the maximum display height becomes 281.25 mm.

The interocular distance of the person may be determined appropriately for the intended viewer. For example, when only an adult is intended, the value of a wide width of 65 mm or the like may be set.

For example, if it is assumed that the interocular distance of the person is 65 mm, and the ratio of the maximum amount of parallax (distant view) with respect to the image width is 15%, the maximum display width which is allowed for stereoscopic vision becomes about 433 mm. When a display having an aspect ratio of 16:9 is assumed, the maximum display height becomes about 244 mm.

Instead of calculation using the interocular distance of the person, a table in which the maximum display size corresponding to the maximum amount of parallax is recorded may be prepared in advance, and the maximum display size may be acquired with reference to the table.

Finally, as shown in FIG. 2, the two viewpoint images 201-2 and 201-3 and the auxiliary information are recorded as one 3D image file using recording part (Step S16).

That is, subsequent to the SOI marker for the viewpoint image 201-2, the maximum display size acquired in Step S15, the supposed visual distance, the maximum amount of parallax (near view) (%) and the maximum amount of parallax (distant view) (%) acquired in Step S14, the convergence angle of the image capturing devices 101-2 and 101-3 in Step S11, the base line length, the viewpoint number, and the number of times of photographing are recorded to be included in the auxiliary information. Thereafter, image information of the viewpoint image 201-2 and the EOI marker are recorded.

The SOI marker, the auxiliary information, the image information, and the EOI marker of the viewpoint image 201-3 are recorded. In the auxiliary information region of the viewpoint image 201-3, only Exif auxiliary information may be recorded.

As described above, the 3D image file shown in FIG. 2 can be recorded.

The 3D image file recorded in this way is read by a stereoscopic image reproduction device when being displayed on a 3D display. At this time, in the stereoscopic image reproduction device, the maximum display size recorded in the auxiliary information of the 3D image file is compared with the display size of the 3D display for display, thereby easily determining whether or not stereoscopic vision is possible. Accordingly, when it is determined that stereoscopic vision is possible, the recorded image may be displayed directly, and processing for adjusting the amount of parallax can be reduced depending on the screen size in the stereoscopic image reproduction device.

When it is necessary to adjust the amount of parallax in the stereoscopic image reproduction device, the amount of parallax can be appropriately adjusted using information regarding the supposed visual distance or the number of times of photographing recorded in the auxiliary information.

Although in this embodiment, the maximum display size is determined on the basis of only the maximum amount of parallax on the distant view side, the maximum display size may be determined taking into consideration the maximum amount of parallax on the near view side. Taking into consideration the maximum amount of parallax on the near view side, the maximum display size capable of appropriately achieving stereoscopic vision on the near view side as well as the distant view side can be determined.

For example, the display size with the amount of parallax of the near view equal to or smaller than 50 mm may be the maximum display size. This is because, if the amount of parallax on the near view side increases, the viewer feels fatigued in stereoscopic vision, and thus it is preferable that the amount of parallax is equal to or smaller than a predetermined amount.

Second Embodiment

Although in the first embodiment, an example where two viewpoint images are photographed from two viewpoints has been described, the number of viewpoints of a stereoscopic image according to the invention is not limited to two, and multi-viewpoint images may be used.

Figure 5:
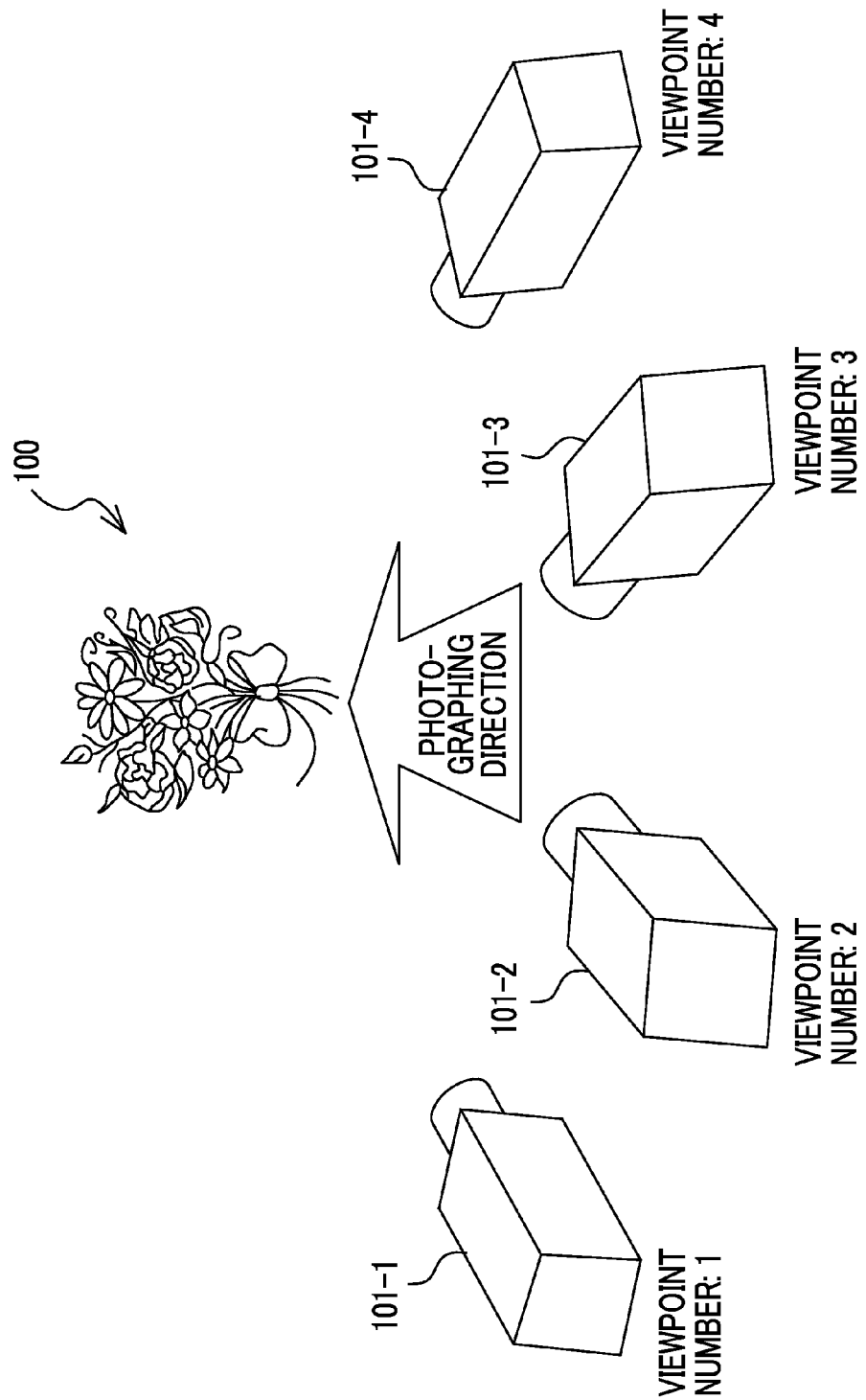
FIG. 5 is a diagram showing a condition in which four viewpoint images are photographed.

FIG. 5 is a diagram showing a condition in which four viewpoint images are photographed from different viewpoints with respect to the subject 100 using four image capturing devices 101-1 to 101-4. It is assumed that the viewpoint numbers of the image capturing devices 101-1 to 101-4 are 1 to 4 in order.

Figure 6:
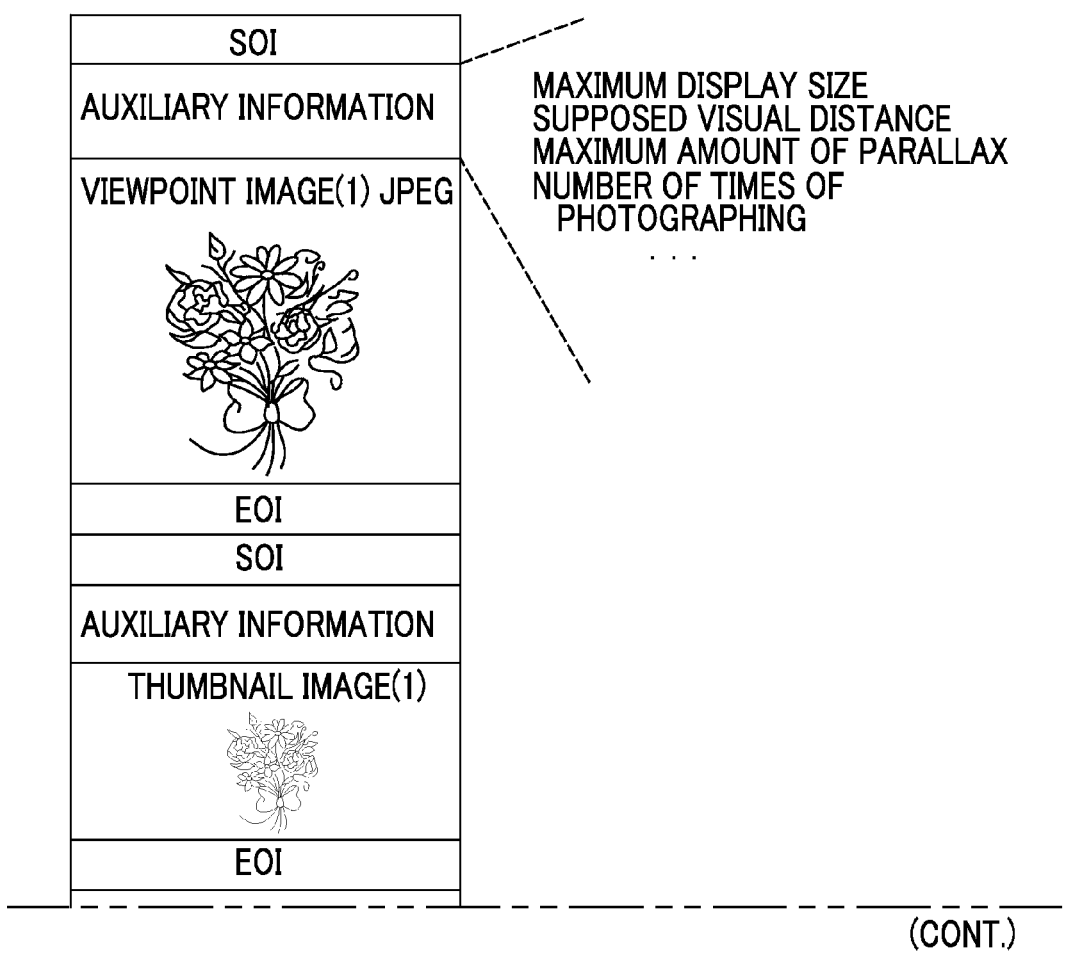
FIG. 6 is a diagram schematically showing the data structure of a 3D image file.

FIG. 6 is a diagram schematically showing the data structure of a 3D image file in which four viewpoint images photographed by the four image capturing devices 101-1 to 101-4 are recorded. In the 3D image file, in addition to the four viewpoint images, an image for display obtained by reducing the size of each viewpoint image generated by display image generation part is recorded. As an image for display, a full HD image having resolution of 1920×1080 is used.

As shown in FIG. 6, these images are recorded in order of a viewpoint image (hereinafter, called a viewpoint image (1)) of a viewpoint number 1, an image (hereinafter, called a thumbnail image (1)) for display of the viewpoint number 1, a viewpoint image (hereinafter, called a viewpoint image (2)) of a viewpoint number 2, an image (hereinafter, called a thumbnail image (2)) for display of the viewpoint number 2, a viewpoint image (hereinafter, called a viewpoint image (3)) of a viewpoint number 3, an image (hereinafter, called a thumbnail image (3)) for display of the viewpoint number 3, a viewpoint image (hereinafter, called a viewpoint image (4)) of a viewpoint number 4, and an image (hereinafter, called a thumbnail image (4)) for display of the viewpoint number 4.

First, the viewpoint image (1) photographed with the viewpoint number 1 as a reference viewpoint is recorded as a head image, and the recording region has an SOI marker, auxiliary information region, an image information region, and an EOI marker.

In the auxiliary information region, as in the first embodiment, in addition to Exif auxiliary information having photographing device information, information regarding a photographing mode, and the like, auxiliary information including a maximum display size, a supposed visual distance, a maximum amount of parallax (near view), a maximum amount of parallax (distant view), a convergence angle of a device photographing each viewpoint image, a base line length, an image capturing unit arrangement (viewpoint number), the number of times of photographing when each viewpoint image is acquired, and the like is recorded.

In regard to the maximum display size, the maximum amount of parallax, and the like, the values where the entire 3D image file is used are recorded. Specifically, the maximum amount of parallax calculated from a viewpoint image (in this case, the viewpoint image (4)) with the greatest amount of parallax on the basis of the viewpoint image (1) photographed with the reference viewpoint, and the maximum display size acquired from the maximum amount of parallax are recorded. In regard the convergence angle, the base line length, and the like, the convergence angle and the base line length to a device photographing the same viewpoint image (in this case, the viewpoint image (4)) are recorded.

In the image information region, image information of the viewpoint image (1) is recorded, and the EOI marker is subsequently recorded.

Subsequently to the viewpoint image (1), the thumbnail image (1) generated from the viewpoint image (1) is recorded, and as before, the recording region has an SOI marker, an auxiliary information region, an image information region, and an EOI marker. In the auxiliary information region, normal Exif auxiliary information is recorded.

Subsequently to the thumbnail image (1), the viewpoint image (2) is recorded. The recording region of the viewpoint image (2) also has an SOI marker, an auxiliary information region, an image information region, and an EOI marker.

In the auxiliary information region, in addition to normal Exif auxiliary information, auxiliary information including a maximum display size calculated from the viewpoint image (2) and the viewpoint image (1) photographed with the reference viewpoint, a supposed visual distance, a maximum amount of parallax (near view), a maximum amount of parallax (distant view), a convergence angle of a device photographing two viewpoint images, a base line length, a viewpoint number, the number of times of photographing of two viewpoint images, and the like is included and recorded.

Subsequently to the viewpoint image (2), the thumbnail image (2) generated from the viewpoint image (2) is recorded, and thereafter, the viewpoint image (3) is recorded.

The recording region of the viewpoint image (3) also has an SOI marker, an auxiliary information region, an image information region, and an EOI marker. In the auxiliary information region, in addition to normal Exif auxiliary information, the maximum display size calculated from the viewpoint image (3) and the viewpoint image (1) photographed with the reference viewpoint, and the like are recorded in the same way.

Hereinafter, in regard to the viewpoint image (4), the same is recorded.

In this way, when recording multi-viewpoint images, it is preferable that the maximum display size as auxiliary information of each viewpoint image in the relation with the head image is recorded.

The 3D image file recorded in this way is read by the stereoscopic image reproduction device when being displayed on the 3D display. At this time, in the stereoscopic image reproduction device, the maximum display size of each viewpoint image recorded in the auxiliary information of the 3D image file is compared with the display size of the 3D display for display, thereby appropriately and easily determining whether or not stereoscopic vision is possible.

The recording order of multi-viewpoint images is not limited to the order shown in FIG. 6.

For example, as shown in FIG. 7A, the viewpoint image (1), the thumbnail image (1) to the thumbnail image (4), and the viewpoint image (2) to the viewpoint image (4) may be recorded in this order. If the thumbnail images for display are recorded earlier, image reading during file reading when display is performed can be quickened, and a required time until images are displayed on the 3D display can be reduced. Each viewpoint image is primarily used for printing, and since printing requires a predetermined time, even when viewpoint image is recorded in the second half portion of the file, there is little adverse effect.

The recording order of the thumbnail images may be set such that recommended images when being displayed on the 3D display are recorded earlier. For example, if stereoscopic display using the thumbnail image (2) and the thumbnail image (3) is recommended, as shown in FIG. 7B, the thumbnail image (2) and the thumbnail image (3) may be recorded next to the viewpoint image (1) as the head image, and thereafter, the thumbnail image (1) and the thumbnail image (4) may be recorded.

When the amount of parallax of two images is small, even in a large display, display can be performed such that stereoscopic vision is possible. An image with a viewpoint close to the center is used appropriately for stereoscopic vision. Accordingly, in such a case, saying images in the viewpoint number 2 and the viewpoint number 3 are recommended, it is preferable the thumbnail image (2) and the thumbnail image (3) are recorded earlier.

Similarly, if stereoscopic display using the thumbnail image (1) and the thumbnail image (3) is recommended, as shown in FIG. 7C, the thumbnail image (1) and the thumbnail image (3) may be recorded next to the viewpoint image (1) as the head image, and thereafter, the thumbnail image (2) and the thumbnail image (4) may be recorded.

When there are recommended images during stereoscopic display, the maximum display size, supposed visual distance, and the maximum amount of parallax in the recommended images may be recorded in the auxiliary information of the viewpoint image (1) as the head image.

Third Embodiment

All multi-viewpoint images in the second embodiment may not be images which are actually photographed, and may include virtual viewpoint images corresponding to virtual viewpoints.

For example, as shown in FIG. 8, two viewpoint images are photographed from different viewpoints (viewpoint number 1 and viewpoint number 4) with respect to the subject 100 using two image capturing devices 101-1 and 101-4. A viewpoint image 2 and a viewpoint image 3 of a viewpoint number 2 and a viewpoint number 3 with virtual viewpoints which are different from a viewpoint number 1 and a viewpoint number 4 and not actually present may be generated using virtual viewpoint image generation part. When generating virtual viewpoint images, there is a method of internally dividing each pixel of a plurality of photographed images, a method of generating virtual viewpoint images using a parallax map generated from a plurality of photographed images and one photographed image, or the like, the method is not particularly limited.

Figure 9A:
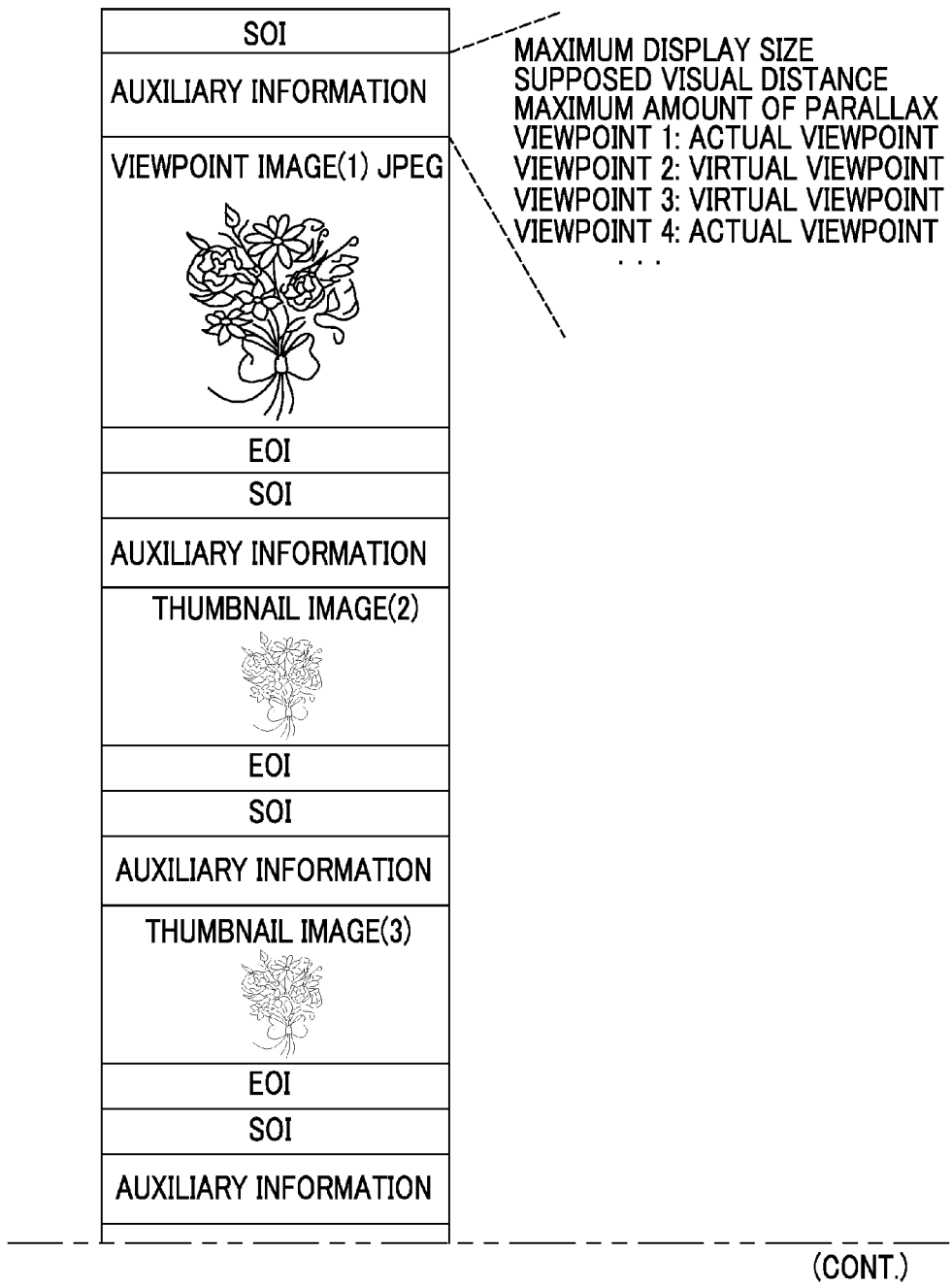
FIGS. 9A and 9B are diagrams schematically showing the data structure of a 3D image file.

FIG. 9A is a diagram schematically showing the data structure of a 3D image file in which the viewpoint images acquired in this way are recorded. In the example of FIG. 9A, two viewpoint images (1) and (4) actually photographed, thumbnail images (1) and (4) as images for display of the viewpoint images, and thumbnail image (2) and (3) as images for display of the virtual viewpoint images are recorded.

First, the viewpoint image (1) is recorded as a head image, then, the thumbnail image (2), the thumbnail image (3), the thumbnail image (1), and the thumbnail image (4) are recorded, and subsequently, the viewpoint image (4) is recorded. Here, the thumbnail images may be recorded in a recommendation order, may be recorded in an arrangement order of viewpoints, or may be recorded in order from the centermost viewpoint. The thumbnail image (2) and the thumbnail image (3) may be generated from the thumbnail image (1) and the thumbnail image (4), or may be generated from the viewpoint image (1) and the viewpoint image (4).

As before, the recording region of each image has an SOI marker, an auxiliary information region, an image information region, and an EOI marker. In the auxiliary information region of the viewpoint image (1), in addition to a maximum display size, a supposed visual distance, and a maximum amount of parallax, viewpoint information representing whether each viewpoint number is a viewpoint (actual viewpoint) with which photographing is actually performed or a virtual viewpoint is recorded.

Figure 9B:
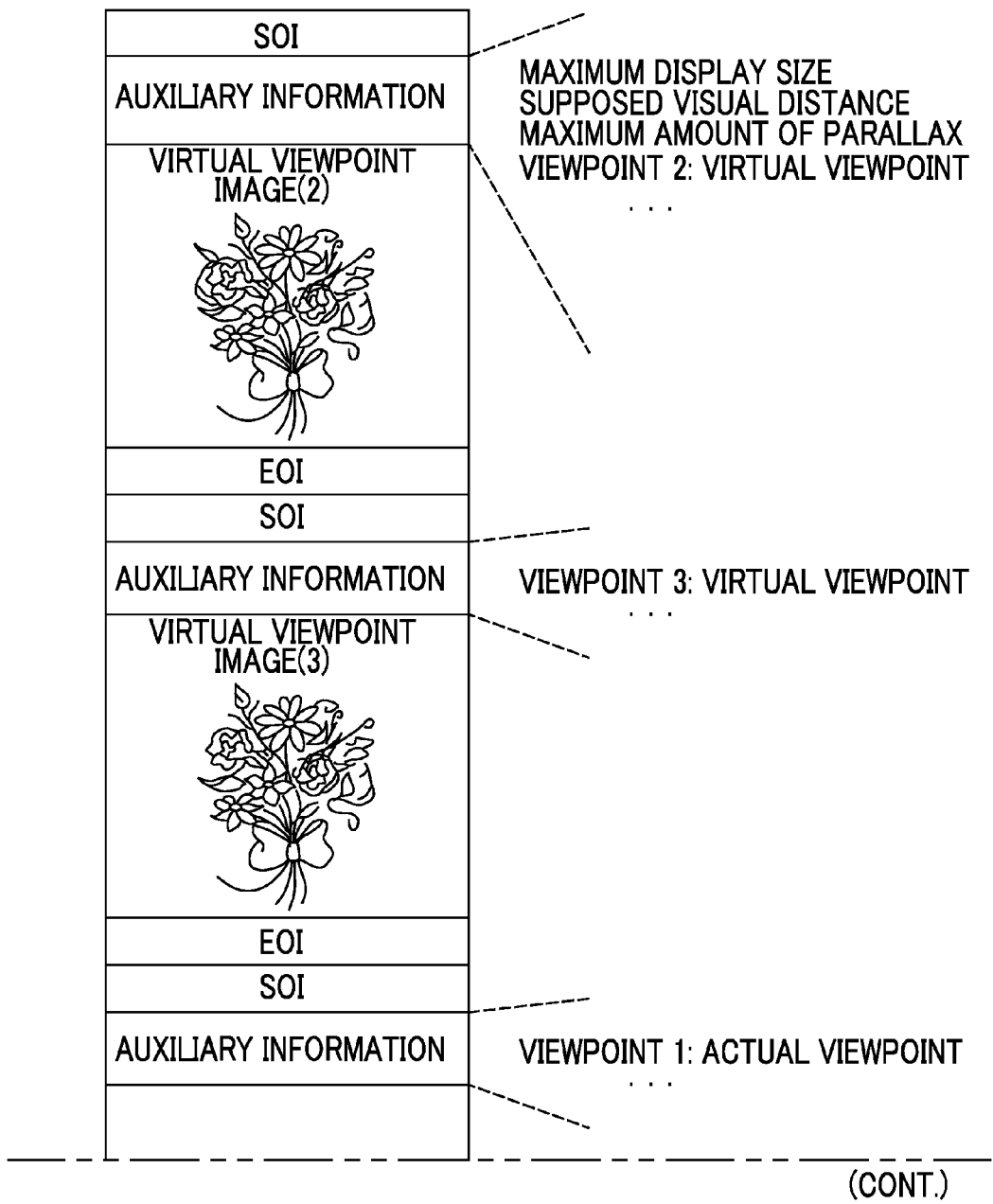

Images for display may not be provided, and only viewpoint images for printing may be recorded. In the example shown in FIG. 9B, two viewpoint images (1) and (4) actually photographed and viewpoint images (2) and (3) which are virtual viewpoint images are recorded.

The recording order may be a recommendation order of printing or display. Specifically, the viewpoint image (2) is recorded as a head image, and subsequently, the viewpoint image (3), the viewpoint image (1), and the viewpoint image (4) are recorded. As before, the viewpoint images may be recorded in an order of viewpoints.

In this way, if virtual viewpoint images are generated and recorded, it should suffice that there are two images as actual viewpoint images, making it possible to simplify and lighten an image capturing optical system of an image capturing device.

Fourth Embodiment

When being displayed on a display of a supposed size, if it is determined that the amount of parallax on the distant view side exceeds the interocular distance of the person, recording may be performed after the amount of parallax of images is adjusted such that stereoscopic vision is possible even when the images are displayed on the display of this size.

In this embodiment, parallax displacement is performed as the adjustment of the amount of parallax.

Figure 10:
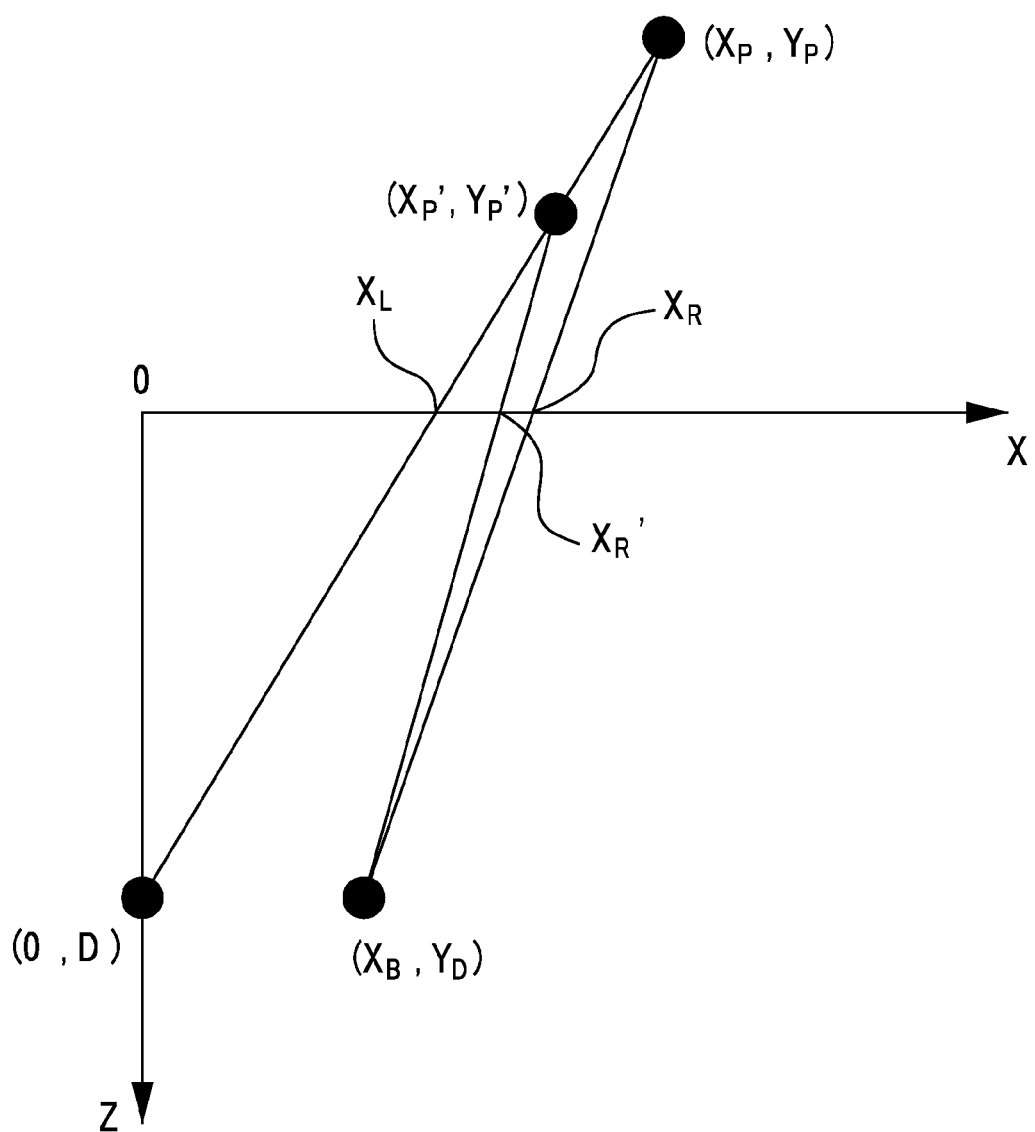
FIG. 10 is a diagram illustrating the principle of parallax displacement.
Figure 11B:
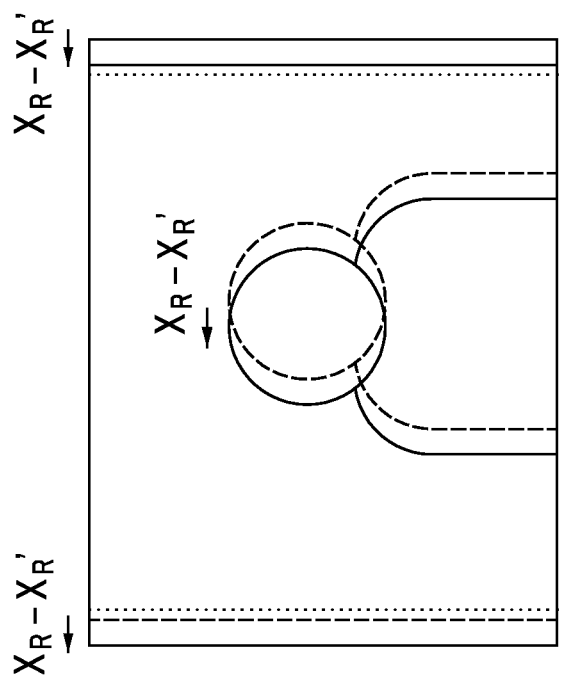
FIGS. 11A and 11B are diagrams showing left and right viewpoint images and parallax displacement.
Figure 11A:
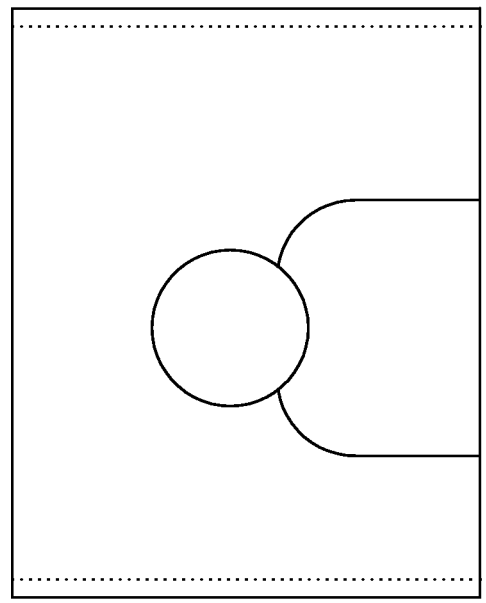

FIG. 10 is a diagram illustrating the principle of parallax displacement. FIG. 11A is a diagram showing a left viewpoint image, and FIG. 11B is a diagram showing a right viewpoint image. Here, it is assumed that the left eye of the viewer is at the coordinates (0,D), and the right eye of the viewer is at the coordinates $(X_E, D)$. In the left and right viewpoint images displayed on Z=0, the subject displayed at the coordinates $(X_L, 0)$ of the left viewpoint image and the coordinates $(X_R, 0)$ of the right viewpoint image is viewed at the coordinates $(X_P, Y_P)$.

In this state, as shown in FIG. 11B, if the right viewpoint image is shifted by $X_R - X_R'$ in the left direction, as shown in FIG. 10, the coordinates of the right viewpoint image of the subject become $(X_R', 0)$, and as a result, the subject is viewed at the coordinates $(X_P', Y_P')$.

In this way, if parallax displacement is performed, the adjustment of the amount of parallax can be performed. Accordingly, if parallax displacement is performed when the amount of parallax on the distant view side exceeds the interocular distance of the person, the amount of parallax can fall within the interocular distance of the person, making it possible to appropriately perform stereoscopic vision.

Figure 12:
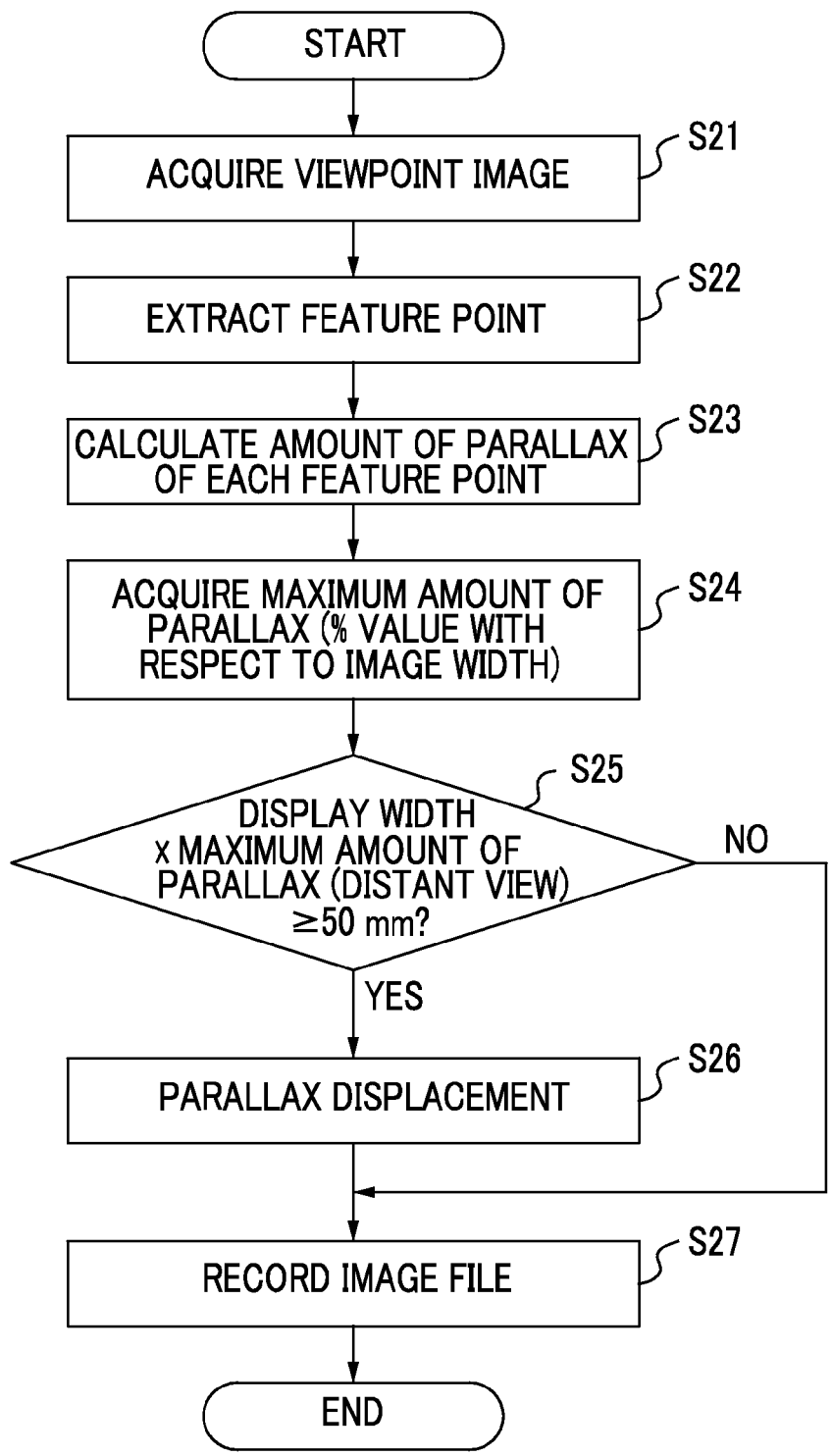
FIG. 12 is a flowchart showing photographing and recording processing.

FIG. 12 is a flowchart showing a photographing and recording principle for recording a 3D image file according to this embodiment.

First, a plurality of viewpoint images are acquired (Step S21). Here, it is assumed that two viewpoint images are photographed. Next, a plurality of feature points are extracted from each two viewpoint images (Step S22), and the amount of parallax of each feature point is calculated (Step S23). The maximum amount of parallax on the near view side and the maximum amount of parallax on the distant view side are acquired from the calculated amount of parallax of each feature point (Step S24).

Here, for a supposed display on which display is performed, the display width is acquired. The display width of the supposed display may be determined in advance and stored, or when a 3D display is connected through an external connection terminal, such as an HDMI terminal, the size of the 3D display may be read through communication based on the connection.

When the stereoscopic image is displayed on the display having this display width, it is determined whether or not the maximum parallax position on the distant view side can be stereoscopically viewed (Step S25). Specifically, the product of the display width and the maximum amount of parallax (%) on the distant view side is calculated, and it is determined whether or not the calculated product is equal to or greater than the interocular distance of the person, 50 mm.

When the calculated product is smaller than 50 mm, the two photographed viewpoint images are recorded directly (Step S27). For example, the viewpoint images may be recorded as the 3D image file having the data structure shown in FIG. 2, or the thumbnail images for display or virtual viewpoint images may be generated and recorded.

When the calculated product is equal to or greater than 50 mm, parallax displacement is performed such that the product becomes smaller than 50 mm and the maximum parallax position on the distant view side can be stereoscopically viewed (Step S26).

As shown in FIGS. 11A and 11B, parallax displacement may be performed by displacing the right viewpoint image in the left direction, or may be performed by displacing the left viewpoint image in the right direction. The left and right viewpoint images may be displaced in a direction in which the images are brought close to each other.

After the parallax displacement processing ends, recording is performed (Step S27). FIG. 13 is a diagram schematically showing the data structure of a 3D image file to be recorded. In the 3D image file, in addition to two photographed original images, images for display and thumbnail images obtained by reducing the size of the original images after parallax displacement are recorded. Here, the images for display are images of full HD size, and the thumbnail images are images of VGA size. The thumbnail images are used, for example, when being displayed for image search on a small liquid crystal display provided on the rear surface of the image capturing device.

As shown in FIG. 13, these images are recorded in order of the image for display of the viewpoint number 1, the image for display of the viewpoint number 2, the thumbnail image of the viewpoint number 1, the thumbnail image of the viewpoint number 2, the original image of the viewpoint number 1, and the original image of the viewpoint number 2, and the recording region of each image has an SOI marker (not shown in the drawing), an auxiliary information region, an image information region, and an EOI marker (not shown in the drawing).

First, the image for display of the viewpoint number 1 as the reference viewpoint is recorded as a head image, and in the auxiliary information region, the maximum amount of parallax is recorded.

The image for display of the viewpoint number 2 is next recorded, and this image is an image after parallax displacement is performed. In the auxiliary information region of the image for display of the viewpoint number 2, information indicating that the parallax displacement processing is completed and the shift amount (unit: pixel) are recorded.

Subsequently, the thumbnail image of the viewpoint number 1 is recorded, and in the auxiliary information region thereof, the maximum amount of parallax is recorded.

The thumbnail image of the viewpoint number 2 is further recorded. The thumbnail image may be an image after parallax displacement, or may be an image generated from the original image of the viewpoint number 2.

Thereafter, the original image of the viewpoint number 1 and the original image of the viewpoint number 2 are recorded. In the auxiliary information region of the original image of the viewpoint number 1, the maximum amount of parallax is recorded.

With this 3D image file, when being displayed on a display of supposed size, the maximum parallax position on the distant view side can be constantly stereoscopically viewed, and thus, the viewer can appropriately view stereoscopic vision.

Since the thumbnail images of VGA size are also recorded, this is effective for display during image search.

The supposed display size may be recorded in the auxiliary information region of the head image. If the supposed display size is recorded, in the stereoscopic image reproduction device, the read supposed display size is compared with the display size of the 3D display for display, thereby appropriately and easily determining whether or not stereoscopic vision is possible.

Fifth Embodiment

Figure 14:
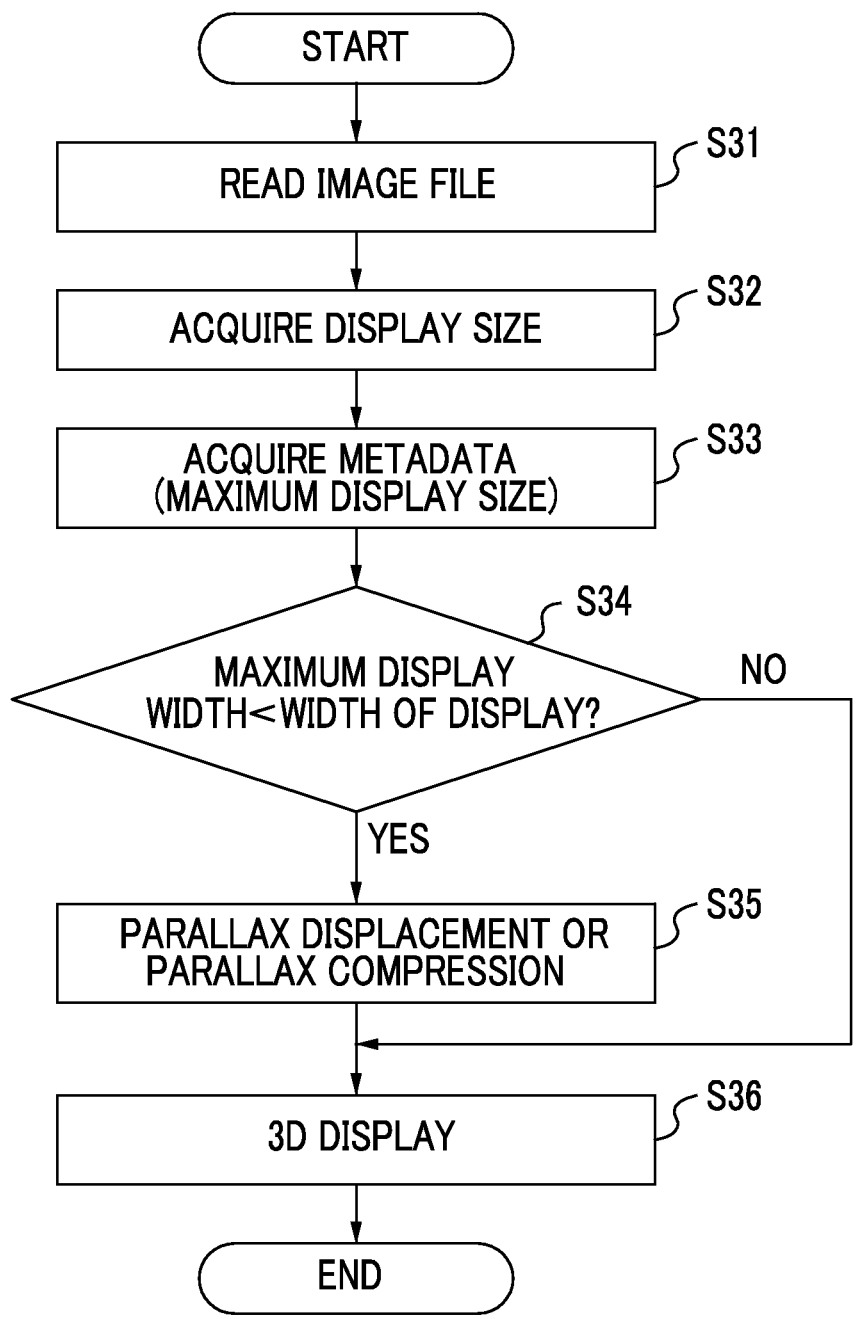
FIG. 14 is a flowchart showing reproduction and display processing.

Next, processing for reading, reproducing, and displaying the 3D image file recorded in this way will be described with reference to the flowchart of FIG. 14.

Initially, a 3D image file is read (Step S31). Simultaneously, the size of a display on which a 3D image is now displayed is acquired (Step S32). The maximum display size of which viewpoint images for 3D display can be appropriately 3D-displayed is acquired from the auxiliary information of the read 3D image file (Step S33).

Next, the lateral width of the display on which the 3D image is now displayed is compared with the width of the maximum display size (Step S34).

When the width of the maximum display size is greater, since there is no difficulty in stereoscopic vision even when the viewpoint images recorded in the 3D image file are displayed directly, the read viewpoint images are displayed directly (Step S36).

However, when the width of the actual display is greater, if the read viewpoint images are displayed directly, the amount of parallax of the maximum parallax position on the distant view side exceeds the interocular distance of the person, and this portion may not be stereoscopically viewed. Accordingly, it is necessary to adjust the amount of parallax of the left and right viewpoint images.

The adjustment of the amount of parallax is performed by parallax displacement or parallax compression (Step S35). As described with reference to FIGS. 11A and 11B, parallax displacement adjusts the amount of parallax by displacing one or both of the left and right viewpoint images. As described with reference to FIG. 8, parallax compression adjusts the amount of parallax by generating images of virtual viewpoints with the amount of parallax smaller than the left and right viewpoint images and displaying the generated images of the virtual viewpoints. When adjusting the amount of parallax, either parallax displacement or parallax compression may be determined in advance or may be selected by the user. In regard to the adjustment of the amount of parallax, even when either parallax displacement or parallax compression is used, the parallax on at least the distant view side can become small.

With the parallax displacement or parallax compression, the amount of parallax is adjusted to the amount of parallax suitable for the width of the display being used, and the adjusted images are 3D-displayed (Step S36).

In this way, the maximum display size recorded as the auxiliary information is read and compared with the display size of which display is actually performed. When the maximum display size is greater, it is determined that there is no problem in stereoscopic vision, and the recorded 3D image is displayed directly. When the display size of which display is actually performed is greater, it is determined that there is a region where stereoscopic vision is not possible, the recorded 3D image is displayed after the amount of parallax is adjusted, making it possible to constantly display an appropriate 3D image.

Such processing may be performed by reading the maximum amount of parallax recorded in the auxiliary information of the 3D image file.

Figure 15:
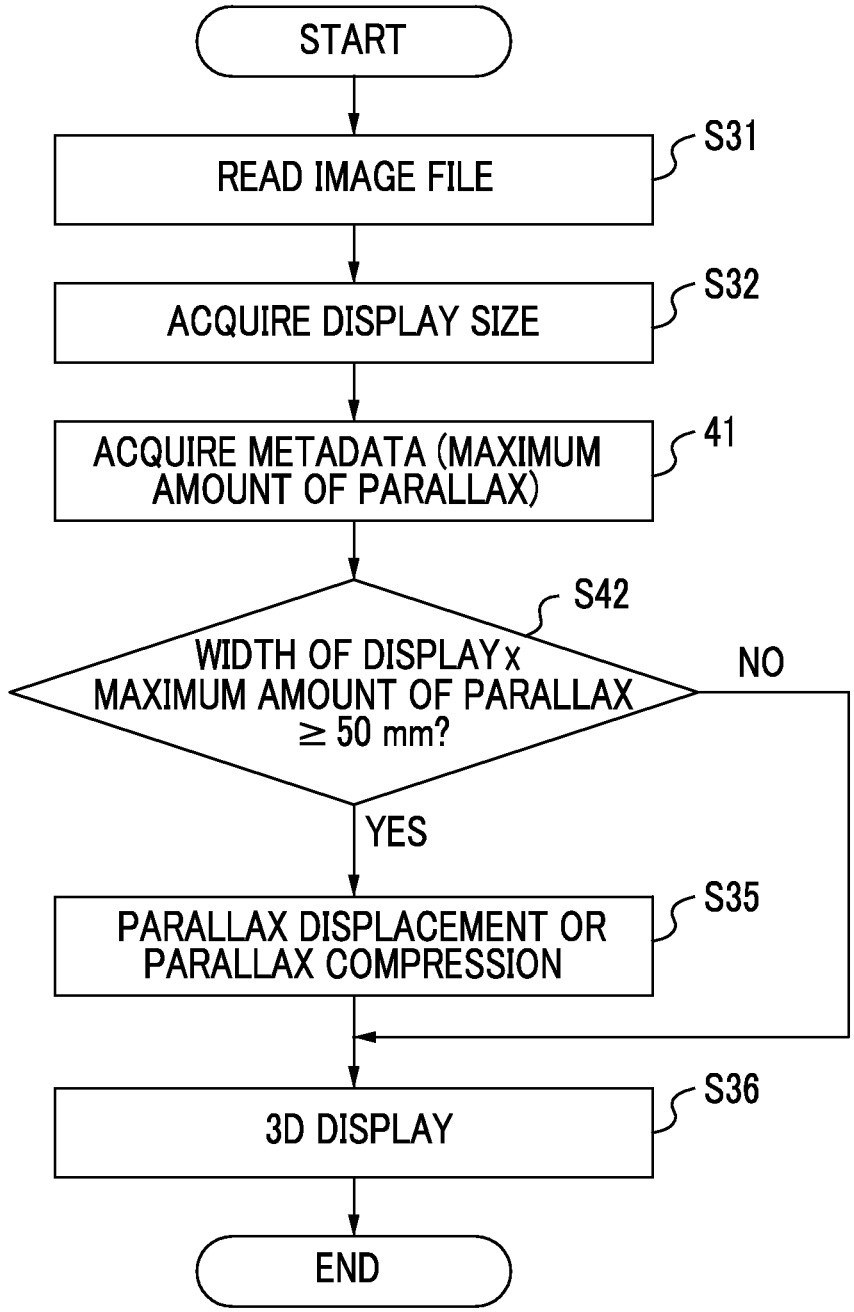
FIG. 15 is a flowchart showing reproduction and display processing based on the maximum amount of parallax.

FIG. 15 is a flowchart when reproduction and display processing is performed on the basis of the maximum amount of parallax. The portions common to the flowchart shown in FIG. 14 are represented by the same reference numerals, and detailed description thereof will not be repeated.

The maximum amount of parallax (distant view) is acquired from the auxiliary information of the read 3D image file (Step S41). The maximum amount of parallax (distant view) is recorded as the ratio (%) with respect to the image width.

Next, it is determined whether or not the product of the width of the display acquired in Step S32 and the maximum amount of parallax (distant view) is equal to or greater than 50 mm (Step S42). The product of the width of the display and the maximum amount of parallax becomes an actual amount of parallax at the maximum parallax amount position (distant view) on a displayed image. When the amount of parallax becomes equal to or greater than the interocular distance of the person, 50 mm, this portion cannot be stereoscopically viewed. For this reason, after the adjustment of the amount by parallax displacement or parallax compression is performed for the read viewpoint images (Step S35), 3D display is performed (Step S36).

When the amount of parallax is smaller than 50 mm, since there is no difficulty even when the recorded viewpoint images are displayed directly, the read viewpoint images are displayed directly (Step S36).

In this way, reproduction and display can be controlled on the basis of the maximum amount of parallax (distant view) read from the 3D image file. In particular, this is effective when the maximum display size is not recorded in the auxiliary information of the 3D image file, and only the maximum amount of parallax is recorded.

Although in this embodiment, when it is determined that 3D display cannot be appropriately performed, 3D display is performed on the entire display after the amount of parallax is adjusted by parallax displacement or parallax compression, 3D display may be performed in an image size with an appropriate amount of parallax, that is, an image size corresponding to the maximum display size.

Sixth Embodiment

Figure 16:
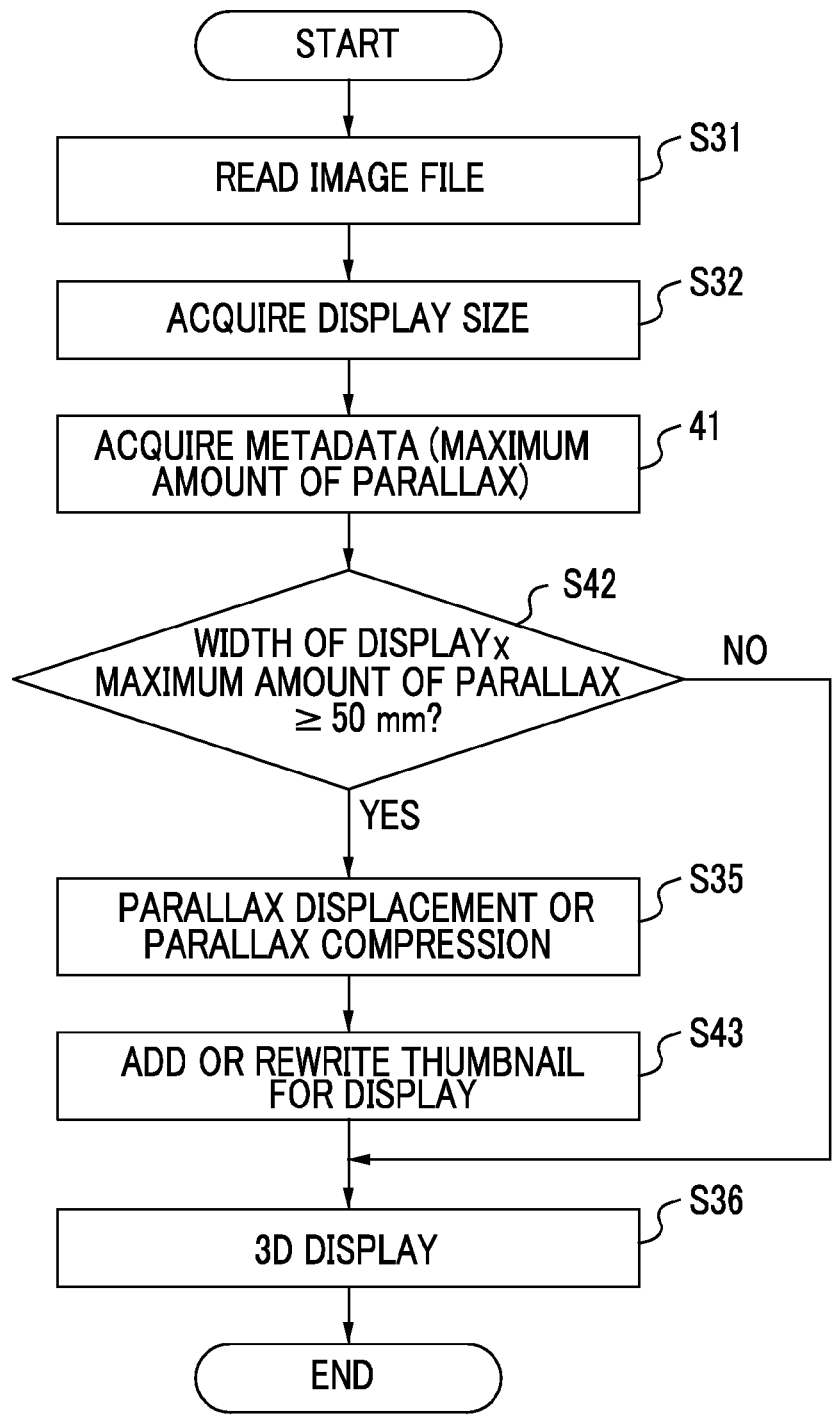
FIG. 16 is a flowchart showing processing for recording a 3D image file.

As described above, images generated by parallax displacement or parallax compression may be recorded in a 3D image file. FIG. 16 is a flowchart when processing for recording images in a 3D image file is performed.

Here, images generated by parallax displacement or parallax compression in Step S35 are added or rewritten to a 3D image file as thumbnail images for display in Step S43. The addition or rewriting to a 3D image file may be performed after 3D display in Step S36.

Figure 17A:
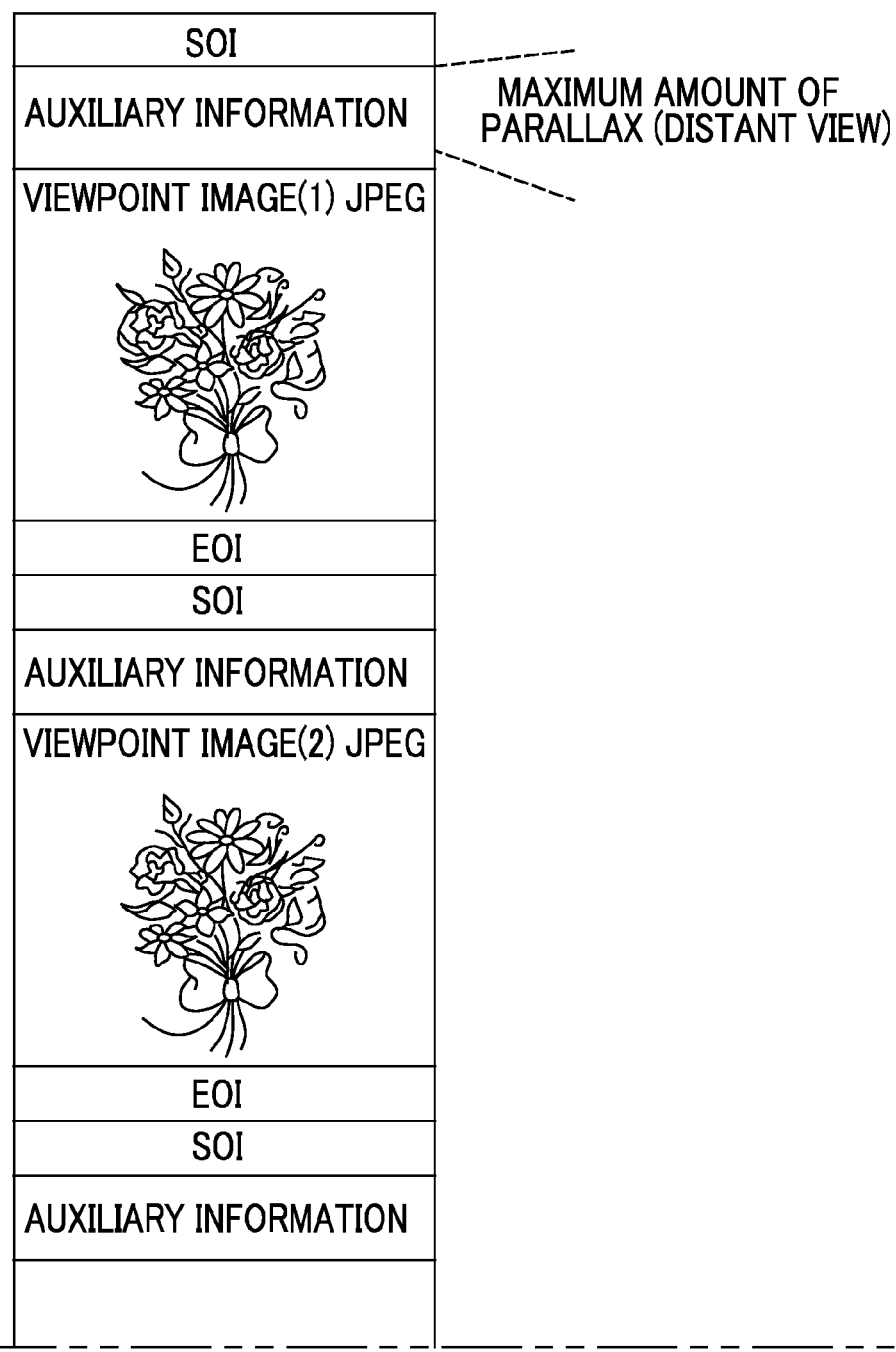
FIGS. 17A and 17B are diagrams schematically showing the data structure of a 3D image file.
Figure 17B:
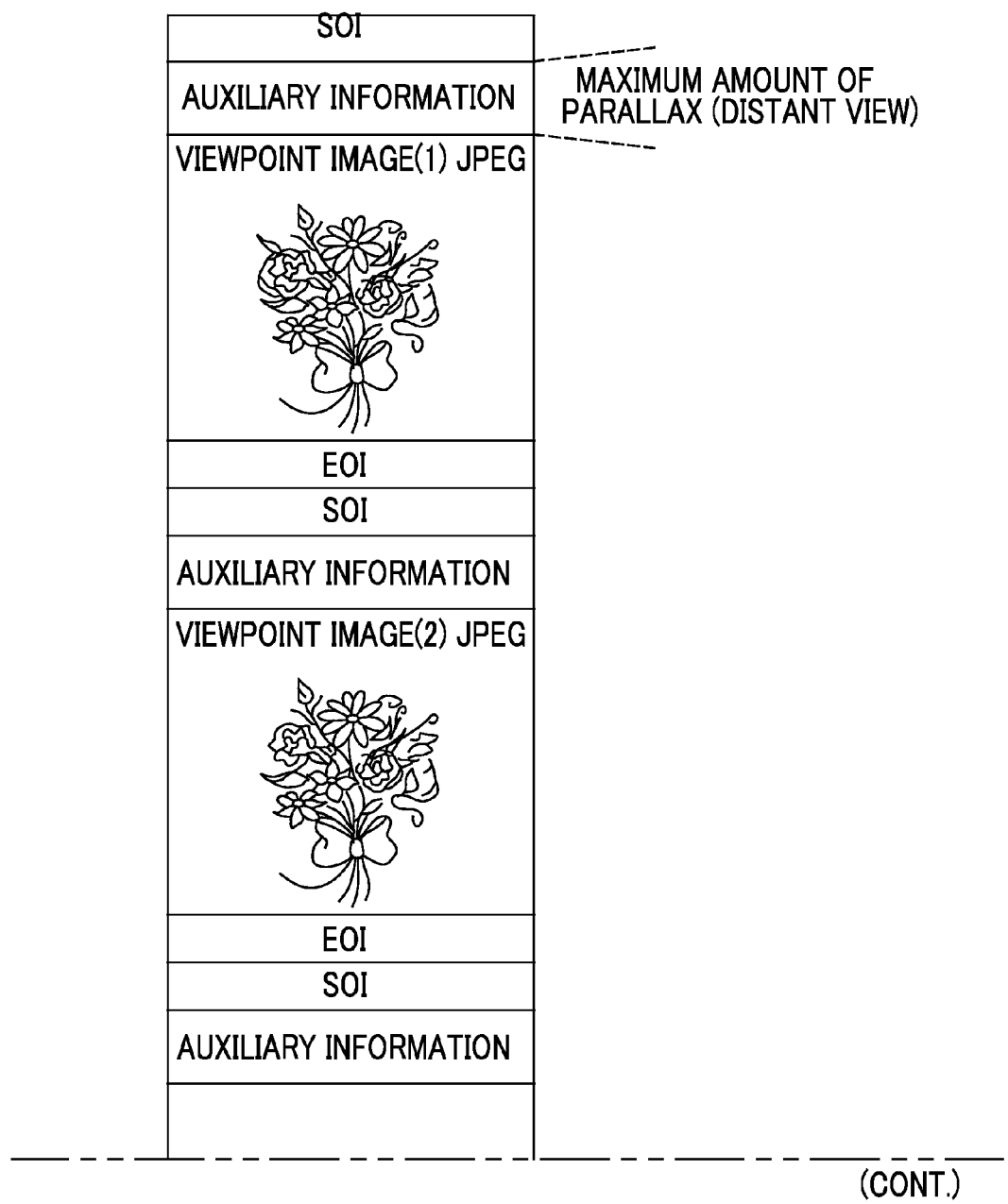

FIGS. 17A and 17B are diagrams schematically showing the data structure of a 3D image file in which four viewpoint images and four thumbnail images for display generated from the viewpoint images are recorded. FIG. 17A shows a 3D image file when being read in Step S31 of FIG. 16, and FIG. 17B shows a 3D image file after rewriting in Step S43. The maximum amount of parallax (distant view) of a viewpoint image (1) and a viewpoint image (4) is recorded in the auxiliary information of the viewpoint image (1) as a head image.

If the maximum amount of parallax is read in Step S41, and it is determined in Step S42 that the product of the width of the display and the maximum amount of parallax (distant view) is equal to or greater than 50 mm, in Step S35, parallax displacement or parallax compression is performed. For example, when parallax displacement of a thumbnail image (4) is performed, in Step S43, the thumbnail image (4) after parallax displacement is recorded instead of the thumbnail image (4). Information representing that the parallax displacement processing is completed and the shift amount (unit: pixel) are recorded in the auxiliary information of the thumbnail image (4) after parallax displacement.

If parallax compression is performed in Step S35, the thumbnail image (4) after parallax compression is recorded as the thumbnail image (4). In this case, the maximum amount of parallax (distant view) after parallax compression may be recorded as the auxiliary information.

Although the thumbnail image (4) after parallax amount adjustment is recorded instead of the thumbnail image (4), the thumbnail image (4) after parallax amount adjustment may be additionally recorded.

Even when there is no thumbnail image for display in the 3D image file when being read in Step S31 of FIG. 16, thumbnail images for display may be generated and recorded as a 3D image file shown in FIG. 17B.

Parallax adjustment is not limited to the thumbnail images, and the parallax adjustment of the viewpoint images may be performed. For example, if the parallax adjustment of the viewpoint image (4) is performed, the viewpoint image (4) and the thumbnail image (4) generated on the basis of the viewpoint image (4) may be overwritten or additionally recorded.

The product of the width of the display and the maximum amount of parallax (distant view) calculated in Step S42 may be recorded in the auxiliary information region of the head image of the 3D image file as the maximum display size.

Seventh Embodiment

Since the parallax compression processing (generation of virtual viewpoint images) requires a certain amount of time, images after parallax compression cannot be immediately displayed, and the viewer may feel inconvenience. In this embodiment, while the parallax compression processing is performed, 2D display is performed on the 3D display.

Figure 18:
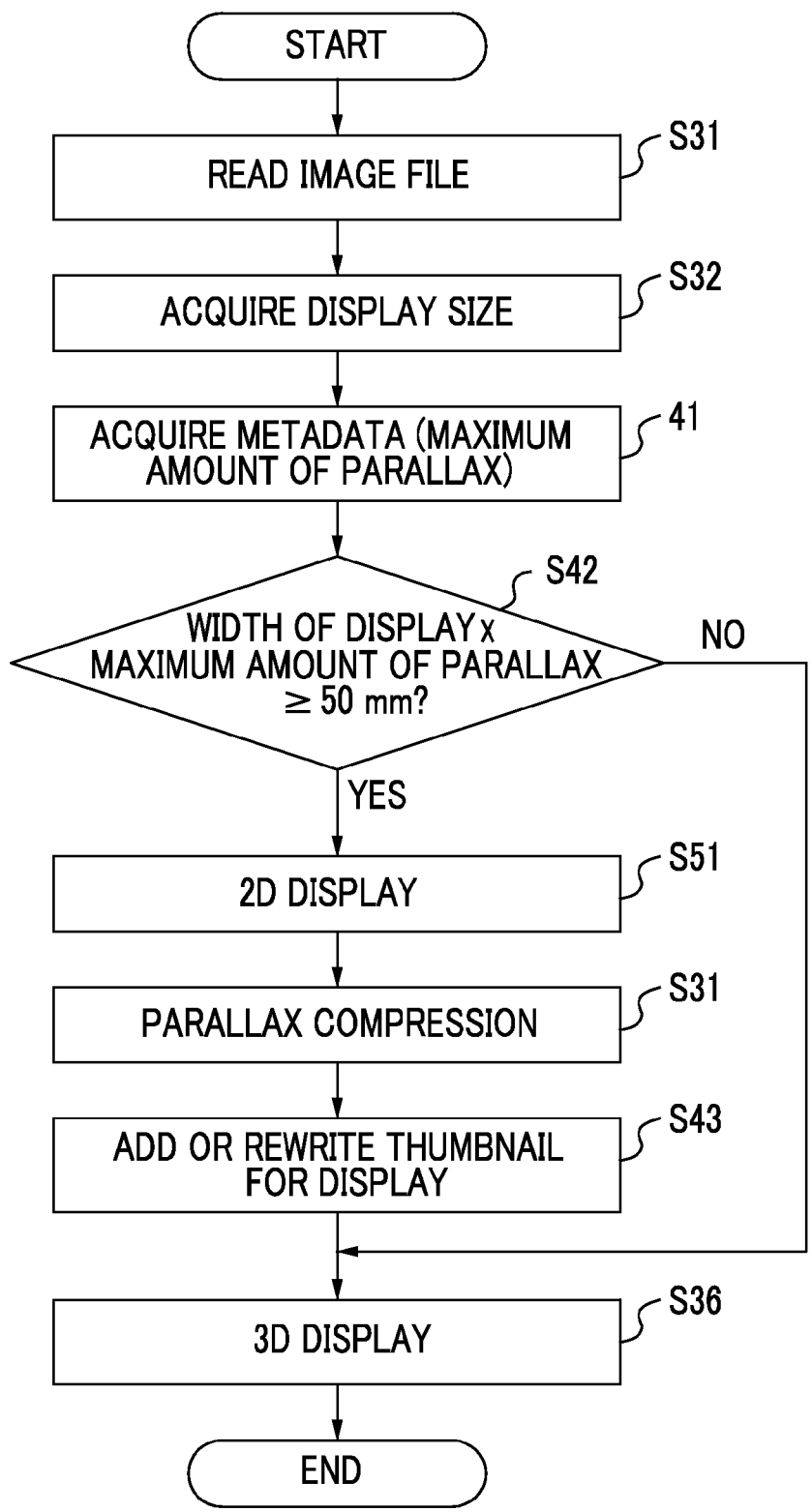
FIG. 18 is a flowchart showing processing for performing 2D display.

FIG. 18 is a flowchart showing processing in which 2D display is performed. The portions common to the flowchart shown in FIG. 16 are represented by the reference numerals, and detailed description thereof will not be repeated.

If it is determined in Step S42 that the product of the width of the display and the maximum amount of parallax (distant view) is equal to or greater than the interocular distance of the person, 50 mm, either the viewpoint images or the thumbnail images for display recorded in the 3D image file are 2D-displayed on the display (Step S51). Thereafter, the parallax compression processing is performed (Step S35).

After the parallax compression processing ends, the thumbnail images for display of the 3D image file are added or rewritten (Step S43), and the images subjected to parallax compression are 3D-displayed on the display (Step S36). After 3D display is performed, the thumbnail images for display may be recorded in the 3D image file.

If 2D display is performed in this way, a drawback in that images cannot be displayed while the parallax compression processing is performed can be covered.

Although an example where parallax compression is performed has been described, when the parallax displacement processing requires a lot of time, 2D display may be performed while the parallax displacement processing is performed. Simultaneously with 2D display, the effect that the parallax amount adjustment processing is performed may be displayed. If display is performed in this way, the viewer can know the reason for performing 2D display on the 3D display.

Eighth Embodiment

Although in the foregoing embodiments, the adjustment of the amount of parallax is performed on the basis of the maximum amount of parallax (distant view), and 3D display is performed, in regard to the adjustment of the amount of parallax, if parallax displacement is performed, there is a drawback in that the amount of parallax on the near view side increases. Accordingly, when parallax displacement is performed, display may be performed taking into consideration the maximum amount of parallax (near view).

FIG. 19 is a flowchart when parallax displacement processing is performed taking into consideration the maximum amount of parallax (near view). The portions common to the flowchart shown in FIG. 16 are represented by the same reference numerals, and detailed description thereof will not be repeated.

In Step S42, it is determined whether or not the product of the width of the display which is used for display and the maximum amount of parallax (distant view) is equal to or greater than the interocular distance of the person, 50 mm. When the product is smaller than 50 mm, since there is no difficulty even when the 3D image recorded in the 3D image file is displayed directly, the read 3D image is displayed directly (Step S64).

When the product is equal to or greater than 50 mm, if display is performed directly, since stereoscopic vision of the maximum parallax position on the distant view side is not possible, it is necessary to adjust the amount of parallax. Accordingly, a parallax displacement amount (necessary displacement amount) in which the product becomes smaller than 50 mm is calculated (Step S61).

Next, when parallax displacement is performed by the calculated necessary displacement amount, it is determined whether or not the maximum parallax amount position on the near view side can be appropriately stereoscopically viewed. Specifically, it is determined whether or not a value obtained by adding the necessary displacement amount to the product of the width of the display which is used for display and the maximum amount of parallax (near view) is equal to or smaller than 50 mm (Step S62). Although it is determined that stereoscopic vision is appropriately possible when the amount of parallax of the near view is equal to or smaller than 50 mm, the value of 50 mm may be appropriately determined.

When the value is equal to or smaller than 50 mm, parallax displacement is executed (Step S63), and the images subjected to parallax displacement are 3D-displayed on the 3D display (Step S64). The images subjected to parallax displacement may be added to rewritten to the 3D image file.

Meanwhile, when the value is greater than 50 mm, if parallax displacement is not performed, there is a portion which cannot be stereoscopically viewed on the distant view side. If parallax displacement is performed such that the maximum amount of parallax on the distant view side becomes appropriate, the near view side cannot be appropriately stereoscopically viewed. For this reason, 3D display is not performed, and 2D display is performed on the 3D display (Step S65). During 2D display, either the viewpoint images or the thumbnail images for display recorded in the 3D image file are displayed. Along with 2D display, the effect that the display size is too large and the images are not 3D-displayed may be warned and displayed.

In this way, the adjustment of the amount of parallax is performed taking into consideration the maximum amount of parallax (near view) as well as the maximum amount of parallax (distant view), thereby displaying an appropriate 3D image.

[Appearance of Stereoscopic Image Capturing Device]

Next, a device for realizing the above-described embodiment will be described.

Figure 20A:
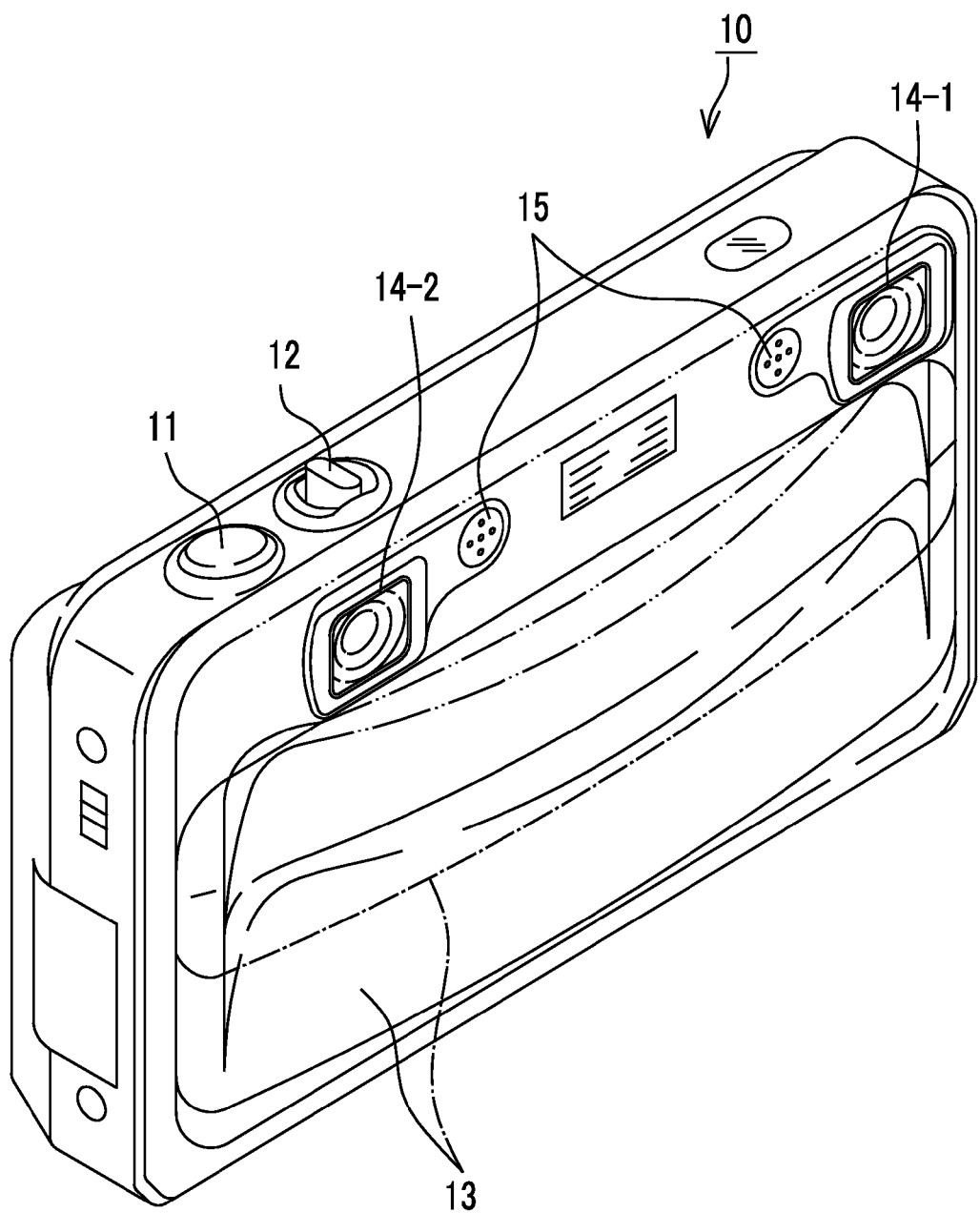
FIGS. 20A and 20B are diagrams showing the appearance of a stereoscopic image capturing device.
Figure 20B:
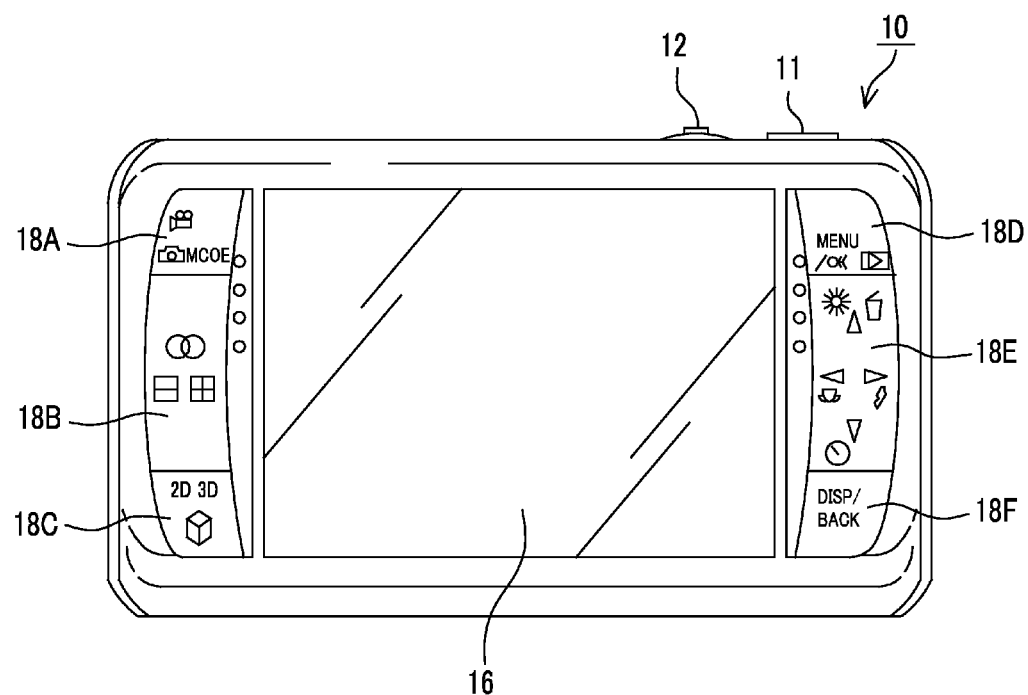

FIGS. 20A and 20B are diagrams showing the appearance of a stereoscopic image capturing device according to the invention. FIG. 20A is a perspective view when a stereoscopic image capturing device is viewed from the front side, and FIG. 20B is a rear view.

A stereoscopic image capturing device (fly-eye camera) 10 is a digital camera in which 2D/3D still images and 2D/3D motion images can be recorded. As shown in FIGS. 20A and 20B, a shutter button 11 and a zoom button 12 are provided on the top surface of a thin rectangular parallelepiped camera body.

A lens barrier 13 substantially having the same width as the width of the camera body in the left-right direction is provided on the front surface of the camera body to freely move in the up-down direction. The lens barrier 13 is moved in the up-down direction between a position indicated by a two-dot-chain line and a position indicated by a solid line to simultaneously open/close the front surfaces of a pair of left and right photographing optical systems 14-1 and 14-2. As the photographing optical systems 14-1 and 14-2, zoom lenses of bent optical systems are used. A camera power supply can be turned on/off in conjunction with the opening/closing operation of the lens front surface by the lens barrier 13.

As shown in FIG. 20B, a liquid crystal monitor 16 for 3D is provided in the center portion on the rear surface of the camera body. The liquid crystal monitor 16 can display a plurality of parallax images (right viewpoint image and left viewpoint image) as directional images having predetermined directivity by a parallax barrier. As the liquid crystal monitor 16 for 3D, a liquid crystal monitor using a lenticular lens, a liquid crystal monitor in which a right viewpoint image and a left viewpoint image can be individually viewed using dedicated glasses, such as polarization glasses or liquid crystal shutter glasses, or the like may be applied.

Various operating switches are provided on the left and right sides of the liquid crystal monitor 16. An operating switch 18A is a selector switch for switching between still image photographing and motion image photographing, an operating switch 18B is a parallax adjustment switch for adjusting the amount of parallax of a right viewpoint image and a left viewpoint image, and an operating switch 18C is a selector switch for switching between 2D imaging and 3D imaging. An operating switch 18D is a seesaw key serving as a MENU/OK button and a play button, an operating switch 18E is a multi-function cross key, and an operating key 18F is a DISP/BACK key.

The MENU/OK button is an operating switch which has a function as a menu button for giving an instruction to display a menu on the screen of the liquid crystal monitor 16 and a function as an OK button for instructing the confirmation and execution of a selected content, or the like. The play button is a button which is used for switching from a photographing mode to a reproduction mode. The cross key is an operating switch which inputs instructions in four directions of up, down, left, and right, and a macro button, a flash button, a self-timer button, and the like are assigned. When the menu is selected, the cross key functions as a switch (cursor movement operating part) for switching an item from the menu screen or for instructing the selection of various setting items from each menu. The left/right key of the cross key functions as a frame-by-frame playback (forward/reverse playback) button in the reproduction mode. The DISP/BACK key is used to switch the display form of the liquid crystal monitor 16, to cancel an instruction content on the menu screen, to return an operation state to a previous operation state, or the like.

In FIG. 20A, reference numeral 15 denotes a stereo microphone.

[Internal Configuration of Stereoscopic Image Capturing Device]

Figure 21:
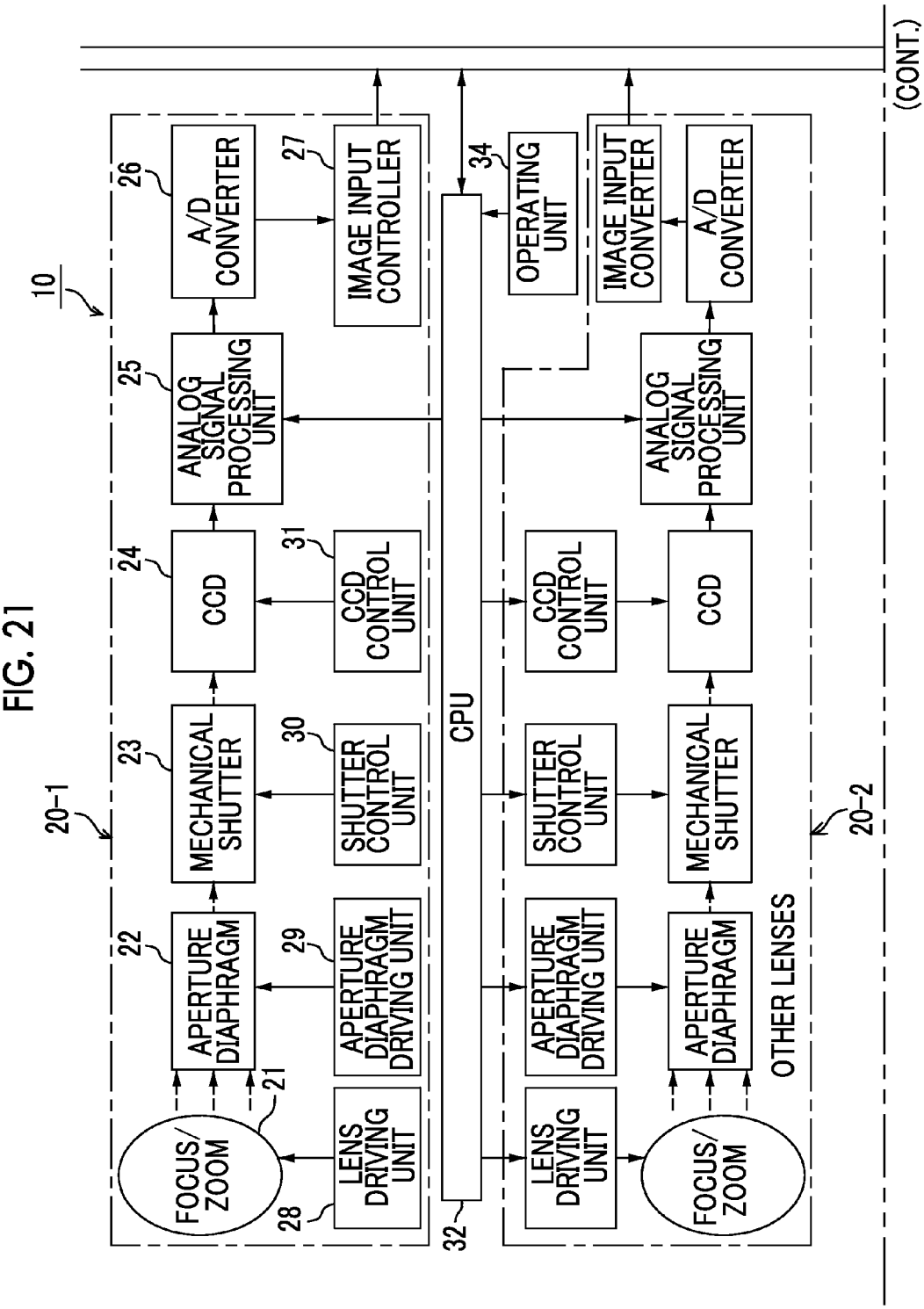
FIG. 21 is a block diagram showing the internal configuration of a stereoscopic image capturing device.

FIG. 21 is a block diagram showing the internal configuration of the stereoscopic image capturing device 10.

As shown in FIG. 21, the stereoscopic image capturing device 10 primarily has a plurality of image capturing units 20-1 and 20-2, a central processing unit (CPU) 32, an operating unit 34 including the shutter button 11 and the zoom button 12 described above and various operating switches, a display control unit 36, a liquid crystal monitor 16, a recording control unit 38, a compression/expansion processing unit 42, a digital signal processing unit 44, an AE (Automatic Exposure) detection unit 46, an AF (Auto Focus) detection unit 48, an AWB (Automatic White Balance) detection unit 50, a VRAM 52, a RAM 54, a ROM 56, an EEPROM 58, and the like. Although the image capturing units 20-1 and 20-2 capture two parallax images of an image for a left eye and an image for a right eye having parallax, three or more image capturing units 20 may be provided.

The image capturing unit 20-1 which captures the image for the left eye includes a prism (not shown), a photographing optical system 14-1 (FIGS. 20A and 20B) having a focus lens/zoom lens 21, optical units having an aperture diaphragm 22 and a mechanical shutter 23, a solid-state image capturing element (CCD) 24, an analog signal processing unit 25, an A/D converter 26, an image input controller 27, a lens driving unit 28, an aperture diaphragm driving unit 29, and a shutter control unit 30 for driving the optical units, and a CCD control unit 31 for controlling the CCD 24. The image capturing unit 20-2 which captures the image for the right eye has the same configuration as the image capturing unit 20-1 which captures the image for the left eye, thus description of a specific configuration will be omitted.

The CPU 32 performs overall control of the operation of the entire camera in accordance with a predetermined control program on the basis of an input from the operating unit 34. The calculation of the maximum display size, parallax displacement, the generation of the virtual viewpoint image, and the like are performed by the CPU 32.

The ROM 56 stores a control program executed by the CPU 32 and various kinds of data necessary for control, and the EEPROM 58 stores various kinds of information representing the adjustment result of adjustment before product shipment, for example, defective pixel information of the CCD 24, correction parameters which are used for image processing, a correspondence table of the maximum amount of parallax and the maximum display size, and the like.

The VRAM 52 is a memory which temporarily stores image data for display on the liquid crystal monitor 16, and the RAM 54 includes a computational work area of the CPU 32 and a temporary storage area of image data.

The focus lens/zoom lens 21 included in the photographing optical system is driven by the lens driving unit 28 and moves back and forth along the optical axis. The CPU 32 controls the driving of the lens driving unit 28 to control the position of the focus lens and to perform focus adjustment such that the subject comes into focus, and controls the zoom position of the zoom lens in accordance with a zoom instruction from the zoom button 12 of the operating unit 34 to change a zoom magnification.

The aperture diaphragm 22 has, for example, an iris diaphragm, and is driven and operated by the aperture diaphragm driving unit 29. The CPU 32 controls the amount (aperture value) of opening of the aperture diaphragm 22 through the aperture diaphragm driving unit 29, and controls the amount of incident light on the CCD 24.

The mechanical shutter 23 opens/closes the optical path to determine the exposure time in the CCD 24, and prevents unwanted light from being incident on the CCD 24 when reading an image signal from the CCD 24, thereby preventing the occurrence of smear. The CPU 32 outputs a shutter closing signal synchronized with the exposure end time corresponding to a shutter speed to the shutter control unit 30, and controls the mechanical shutter 23.

The CCD 24 has a two-dimensional color CCD solid-state image capturing element. Multiple photodiodes are two-dimensionally arranged on the light-receiving surface of the CCD 24, and color filters are disposed in each photodiode with a predetermined arrangement.

The optical image of the subject focused on the CCD light-receiving surface through the optical units having the above-described configuration is converted to a signal charge according to the amount of incident light by the photodiodes. The signal charges accumulated in each photodiode are sequentially read from the CCD 24 as a voltage signal (image signal) according to the signal charges in accordance with an instruction of the CPU 32 on the basis of a driving pulse from the CCD control unit 31. The CCD 24 has an electronic shutter function, and controls a charge accumulation time into the photodiode to control the exposure time (shutter speed). The charge accumulation start time corresponding to the shutter speed is controlled by the electronic shutter, and the mechanical shutter 23 is closed to control the exposure end time (charge accumulation end time). Although in this embodiment, the CCD 24 is used as an image capturing element, an image capturing element having a different configuration, such as a CMOS sensor, may be used.

R, G, and B analog signals read from the CCD 24 are subjected to double-correlated sampling (CDS) or amplification by the analog signal processing unit 25, and converted to R, G, and B digital signals by the A/D converter 26.

The image input controller 27 has an internal line buffer of a predetermined capacity, temporarily accumulates R, G, and B image signals (CCD RAW data) A/D converted by the A/D converter 26, and stores the R, and B image signals in the RAM 54 through a bus 60.

In a 3D image capturing mode, the CPU 32 controls the image capturing unit 20-2 which captures the right viewpoint image in the same manner as the image capturing unit 20-1 which captures the left viewpoint image.

The AE detection unit 46 calculates subject luminance necessary for AE control on the basis of the image signals introduced when the shutter button 11 is half-pressed, and outputs a signal representing subject luminance (photographing EV value) to the CPU 32. The CPU 32 sets the shutter speed (exposure time), the aperture value, and photographing sensitivity in a plurality of image capturing units 20-1 and 20-2 in accordance with a predetermined program diagram on the basis of the input photographing EV value.

The AF detection unit 48 integrates the absolute value of a high-frequency component of an image signal of an AF area introduced when the shutter button 11 is half-pressed, and outputs the integrated value (AF evaluation value) to the CPU 32. The CPU 32 moves the focus lens from a close range side to an infinite side, searches for a focusing position where the AF evaluation value detected by the AF detection unit 48 is maximal, and moves the focus lens to the focusing position, thereby performing focus adjustment on the subject (main subject). During motion image photographing, socalled mountain-climbing control is performed to move the focus lens such that the AF evaluation value constantly has the maximum value.

The AWB detection unit 50 automatically obtains a light source type (color temperature of field) on the basis of the R, G, and B image signals acquired during this image capturing, and reads a corresponding white balance gain from a table which stores R, G, and B white balance gains (white balance correction values) according to the light source type in advance.

The digital signal processing unit 44 includes a white balance correction circuit, a gradation conversion processing circuit (for example, a gamma correction circuit), a synchronization circuit which interpolates spatial deviations of color signals of R, G, B, and the like depending on the color filter arrangement of a single-plate CCD to position the color signals, a contour correction circuit, a luminance/color difference signal generation circuit, and the like, and performs image processing on the R, G, and B image signals (CCD RAW data) stored in the RAM 54. That is, R, G, and B CCD RAW data are subjected to white balance correction by multiplying the white balance gains detected by the AWB detection unit 50 in the digital signal processing unit 44, then subjected to the predetermined processing, such as gradation conversion processing (for example, gamma correction), and converted to YC signals having a luminance signal (Y signal) and a color-difference signal (Cr and Cb signals). The YC signals processed by the digital signal processing unit 44 are stored in the RAM 54.

The digital signal processing unit 44 also includes a distortion correction circuit which corrects lens distortion of the photographing optical systems of a plurality of image capturing units 20-1 and 20-2, and an image clipping circuit which clips images of predetermined clipping areas from the left and right viewpoint images to correct optical axis deviations of the photographing optical systems of a plurality of image capturing units 20-1 and 20-2.

The compression/expansion processing unit 42 compresses the YC signals stored in the RAM 54 in accordance with an instruction from the CPU 32 during recording in a memory card 40, or expands compressed data recorded in the memory card 40 to obtain the YC signals.

The recording control unit 38 converts compressed data compressed by the compression/expansion processing unit 42 to an image file of a predetermined format (for example, a 3D still image becomes an MP file, and a 3D motion image becomes a motion image file of motion JPEG, H.264, MPEG4, or MPEG4-MVC), records the image file in the memory card 40, or reads an image file from the memory card 40.

The recording control unit 38 records the maximum display size, the supposed visual distance, the maximum amount of parallax (near view) (%), the maximum amount of parallax (distant view) (%), and the like as auxiliary information in the memory card 40 along with Exif auxiliary information, when recording an MP file according to the invention.

The liquid crystal monitor 16 is used as an image display unit which displays photographed images, and is also used as a GUI (Graphical User Interface) during various settings. The liquid crystal monitor 16 is also used as an electronic view-finder which displays live view images (hereinafter, referred to as "through images" for confirming an image angle in the photographing mode. When a 3D image is displayed on the liquid crystal monitor 16, the display control unit 36 alternately displays a left viewpoint image and a right viewpoint image held in the VRAM 52 pixel by pixel. With the parallax barrier provided in the liquid crystal monitor 16, left and right images alternately arranged pixel by pixel are separately viewed by the left and right eyes of the user who observes at a predetermined distance. Accordingly, stereoscopic vision is possible.

With the stereoscopic image capturing device 10 configured as above, the embodiment can be realized. Although the stereoscopic image capturing device 10 described herein includes the two image capturing units for photographing images of left and right two viewpoints, three or more image capturing units may be provided to photograph three or more viewpoint images. For example, four image capturing units, such as the four image capturing devices 101-1 to 101-4 shown in FIG. 5, may be provided to photograph four viewpoint images.

[Stereoscopic Image Reproduction Device]

Fifth to eighth embodiments may be realized in a stereoscopic image reproduction device in which no image capturing unit is provided.

Figure 22:
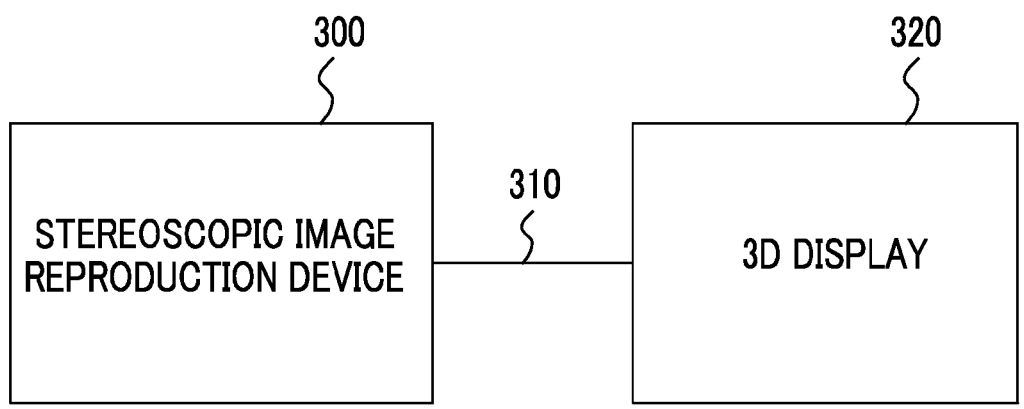
FIG. 22 is a diagram showing the overall structure of a stereoscopic image reproduction device and a 3D display.

FIG. 22 is a diagram showing the overall configuration of a stereoscopic image reproduction device 300 and a 3D display 320 according to the invention. As shown in FIG. 22, the stereoscopic image reproduction device 300 and the 3D display 320 are separate devices and are communicably connected together by a communication cable 310.

The 3D display 320 is a parallax barrier-type or a lenticular-type display, and a left viewpoint image and a right viewpoint image input from the stereoscopic image reproduction device 300 to the 3D display 320 are alternately displayed line by line.

The 3D display 320 may alternately switch and display the left viewpoint image and the right viewpoint image in a temporal manner. In this case, the viewer views the 3D display 320 using special glasses.

Figure 23:
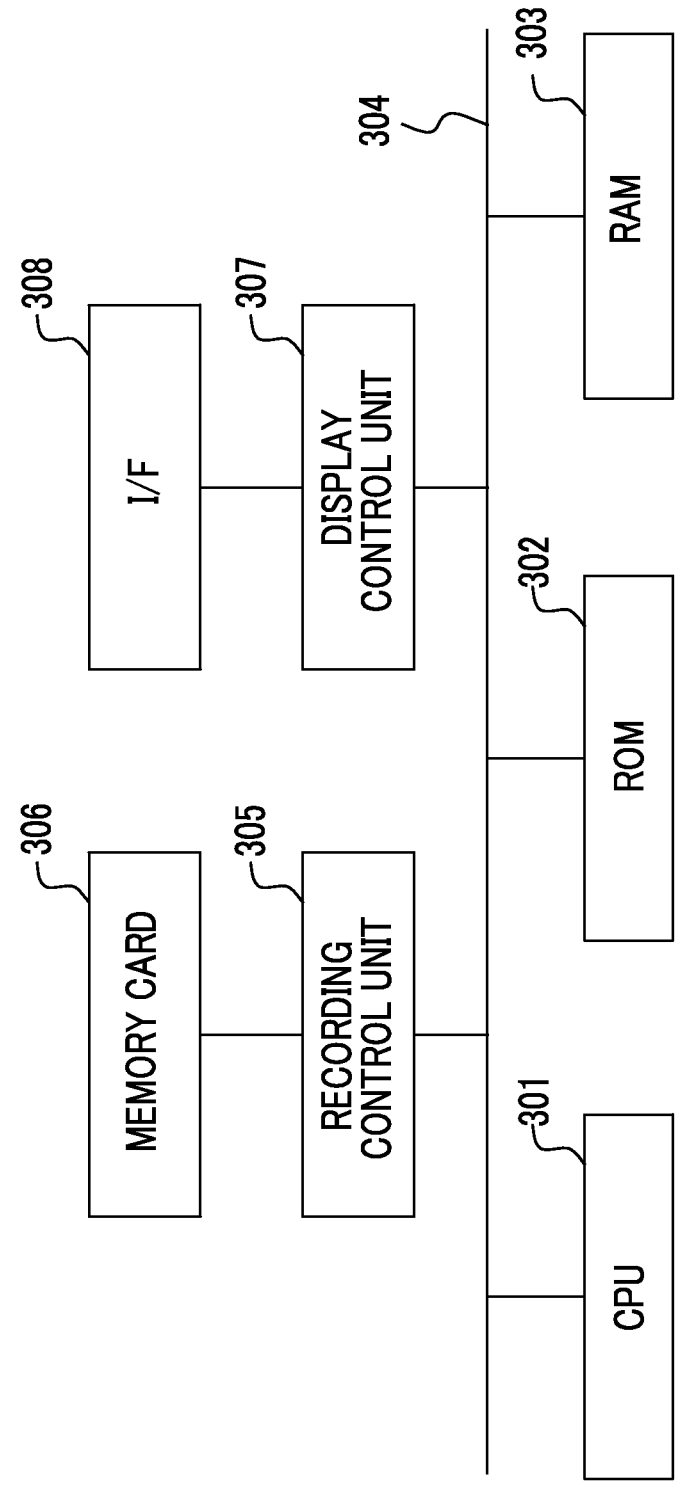
FIG. 23 is a block diagram showing the internal configuration of a stereoscopic image reproduction device.

FIG. 23 is a block diagram showing the internal configuration of the stereoscopic image reproduction device 300. As shown in FIG. 23, the stereoscopic image reproduction device 300 includes a CPU 301, a recording control unit 305, a memory card 306, a display control unit 307, a communication interface 308, and the like.

The CPU 301 performs overall control of the operation of the entire stereoscopic image reproduction device 300 on the basis of a control program recorded in a ROM 302. A RAM 303 is used as a computational work area of the CPU 301.

The recording control unit 305 and the display control unit 307 are connected to the CPU 301 through a bus 304. The recording control unit 305 controls data reading and writing of a 3D image file with respect to the memory card 306. The memory card 306 is, for example, the same as the memory card 40 of the stereoscopic image capturing device 10 shown in FIG. 21, and records a 3D image file including the viewpoint images photographed in the stereoscopic image capturing device 10 and auxiliary information.

The communication interface 308 is a connector unit to which a communication cable 310 is connected, and the display control unit 307 displays a stereoscopic image on the 3D display 320 through the communication interface 308 and the communication cable 310. As the communication interface 308 and the communication cable 310, those based on the HDMI standard may be used. According to the HDMI standard, the stereoscopic image reproduction device 300 can acquire the display size of the 3D display 320 connected thereto through the communication cable 310.

Fly-eye image capturing part for photographing viewpoint images may be provided in the stereoscopic image reproduction device 300, and the photographed viewpoint images may be recorded in the memory card 306. The stereoscopic image reproduction device 300 and the 3D display 320 may be constituted as a single device.

What is claimed is:

1. A stereoscopic image reproduction device comprising:
   first acquisition part for reading a three-dimensional image file having recorded therein a plurality of viewpoint images for stereoscopic vision and auxiliary information for the plurality of viewpoint images, the auxiliary information including the maximum display size enabling binocular fusion when the plurality of viewpoint images are displayed on a stereoscopic display, and acquiring the plurality of viewpoint images and the auxiliary information from the three-dimensional image file;
   second acquisition part for acquiring the display size of the stereoscopic display as an output destination;
   determination part for comparing the acquired display size of the stereoscopic display with the maximum display size and determining whether or not the display size of the stereoscopic display is greater than the maximum display size;
   image processing part for generating a plurality of viewpoint images with smaller parallax on at least a distant view side between the plurality of viewpoint images on the basis of the plurality of viewpoint images acquired by the first acquisition part if it is determined that the display size of the stereoscopic display is greater than the maximum display size; and
   output part for outputting the viewpoint images generated by the image processing part to the stereoscopic display if the determination part determines that the display size of the stereoscopic display is greater than the maximum display size and outputting the viewpoint images acquired by the first acquisition part to the stereoscopic display if it is determined that the display size of the stereoscopic display is equal to or smaller than the maximum display size.

2. The stereoscopic image reproduction device according to claim 1,
   wherein the image processing part performs parallax displacement between the plurality of viewpoint images such that the maximum amount of parallax on the distant view side of the plurality of viewpoint images on the stereoscopic display is equal to or smaller than a predetermined value representing an interocular distance of a person, and generating viewpoint shift images subjected to the parallax displacement.

3. The stereoscopic image reproduction device according to claim 2,
   wherein the auxiliary information of the three-dimensional image file includes the maximum amount of parallax on a near view side in the plurality of viewpoint images,
   the stereoscopic image reproduction device further includes addition part for adding the maximum amount of parallax on the near view side of the plurality of viewpoint images on the stereoscopic display and the amount of deviations of the viewpoint shift images on the stereoscopic display; and
   determination part for determining whether or not the amount of image deviation corresponding to the added maximum amount of parallax on the near view side exceeds a binocular fusion limit when being displayed on the stereoscopic display, and
   if the determination part determines that the amount of image deviation exceeds the binocular fusion limit, the output part outputs one of the plurality of viewpoint images acquired by the first acquisition part to the stereoscopic display to display a two-dimensional image.

4. The stereoscopic image reproduction device according to claim 1,
   wherein the image processing part has parallax amount calculation part for calculating the amount of parallax representing the amount of deviation between feature points having common features from the plurality of viewpoint images acquired by the first acquisition part, and virtual viewpoint image generation part for generating one or a plurality of virtual viewpoint images corresponding to an arbitrary virtual viewpoint on the basis of at least one viewpoint image from the plurality of viewpoint images acquired by the first acquisition part and the amount of parallax calculated by the parallax amount calculation part.

5. The stereoscopic image reproduction device according to claim 4,
   wherein the output part outputs one of the plurality of viewpoint images acquired by the first acquisition part to the stereoscopic display to display a two-dimensional image if the determination part determines that the display size of the stereoscopic display is greater than the maximum display size or if the calculated amount of image deviation exceeds a predetermined value representing an interocular distance of a person, and outputs the virtual viewpoint images instead of the two-dimensional image if the virtual viewpoint images are generated by the image processing part.

6. The stereoscopic image reproduction device according to claim 1, the stereoscopic image reproduction device further comprising:
   display image generation part for generating a plurality of display images of size smaller than the viewpoint images on the basis of the plurality of viewpoint images,
   wherein the image processing part generates a plurality of display images with smaller parallax on at least the distant view side between the plurality of display images using the plurality of generated display images instead of the plurality of viewpoint images acquired by the first acquisition part, and
   the output part outputs the display images generated by the display image generation part or the display images generated by the image processing part to the stereoscopic display.

7. The stereoscopic image reproduction device according to claim 1, the stereoscopic image reproduction device further comprising:
   recording part for adding or overwriting at least one of the viewpoint images generated by the image processing part and the display images generated by the display image generation part to the three-dimensional image file.

8. A stereoscopic image capturing device comprising:
   image capturing part for acquiring a plurality of viewpoint images of the same subject from a plurality of viewpoints;
   parallax amount calculation part for calculating the amount of parallax representing the amount of displacement between feature points having common features from the plurality of acquired viewpoint images;

maximum parallax amount acquisition part for acquiring the maximum amount of parallax on a distant view side from the calculated amount of parallax of each feature point;

maximum display size acquisition part for acquiring the maximum display size enabling binocular fusion when a stereoscopic image based on the plurality of viewpoint images is displayed on a stereoscopic display on the basis of the acquired maximum amount of parallax on the distant view side;

recording part for generating a three-dimensional image file in which the plurality of viewpoint images are recorded, and recording the three-dimensional image file in a recording medium, the recording part recording the plurality of viewpoint images in the three-dimensional image file and also recording the maximum amount of parallax on the distant view side and the maximum display size in the three-dimensional image file as auxiliary information; and the stereoscopic image reproduction device according to claim 1.

9. A stereoscopic display device comprising:
a stereoscopic display as an output destination; and
the stereoscopic image reproduction device according to claim 1.

10. A stereoscopic image reproduction method comprising:

a first acquisition step of reading a three-dimensional image file having recorded therein a plurality of viewpoint images for stereoscopic vision and auxiliary information for the plurality of viewpoint images, the auxiliary information including the maximum display size enabling binocular fusion when the plurality of viewpoint images are displayed on a stereoscopic display, and acquiring the plurality of viewpoint images and the auxiliary information from the three-dimensional image file;

a second acquisition step of acquiring the display size of the stereoscopic display as an output destination;

a determination step of comparing the acquired display size of the stereoscopic display with the maximum display size and determining whether or not the display size of the stereoscopic display is greater than the maximum display size;

an image processing step of generating a plurality of viewpoint images with smaller parallax on at least a distant view side between the plurality of viewpoint images on the basis of the plurality of viewpoint images acquired in the first acquisition step if it is determined that the display size of the stereoscopic display is greater than the maximum display size; and an output step of outputting the viewpoint images generated in the image processing step to the stereoscopic display if it is determined in the determination step that the display size of the stereoscopic display is greater than the maximum display size and outputting the viewpoint images acquired in the first acquisition step to the stereoscopic display if it is determined that the display size of the stereoscopic display is equal to or smaller than the maximum display size.

* * * * *